United States Patent [19]

Higgins et al.

[11] Patent Number: 4,491,917

[45] Date of Patent: Jan. 1, 1985

[54] DOOR CONTROL SYSTEMS

[75] Inventors: Philip M. Higgins, Wilmette; William B. MacKenna, Wheeling; Lawrence G. Sickels, Antioch; Richard A. Stumpf, Evanston, all of Ill.

[73] Assignee: Vapor Corporation, Chicago, Ill.

[21] Appl. No.: 266,306

[22] Filed: May 22, 1981

[51] Int. Cl.³ .............................................. G06F 15/20

[52] U.S. Cl. .................................... 364/424; 180/286; 49/13

[58] Field of Search ................ 364/424; 180/282, 286, 180/289; 104/28, 27; 105/329 R; 246/127, 292; 49/13, 26-28, 31

[56] References Cited

U.S. PATENT DOCUMENTS 3,744,022 7/1973 Olsen .................................. 180/286

3,782,034 1/1974 Lynn et al. ............................ 49/13

*Primary Examiner*—Edward J. Wise

*Attorney, Agent, or Firm*—Francis J. Lidd

[57] ABSTRACT

A door control system, particularly suited for multiple door rapid transit vehicles wherein car operating parameters including car speed sensing (5), traction propulsion sensing (7), and other indications of internal circuitry establish and continuously test for predetermined conditions under which a power operated door can be opened. A low speed detector (1) incorporates a micro-processor (8) and a no motion relay (3) to evaluate car and circuit operating conditions, providing control of all transit car doors. The micro-processor and associated control equipment also recognize predetermined failure modes. Occurrence of predetermined failure modes results in the overall system (1) reverting to a more conservative state. Coded indication (2) of failure modes is provided for easy indentification and corrective action by train operating crews.

24 Claims, 10 Drawing Figures

FIG. 2
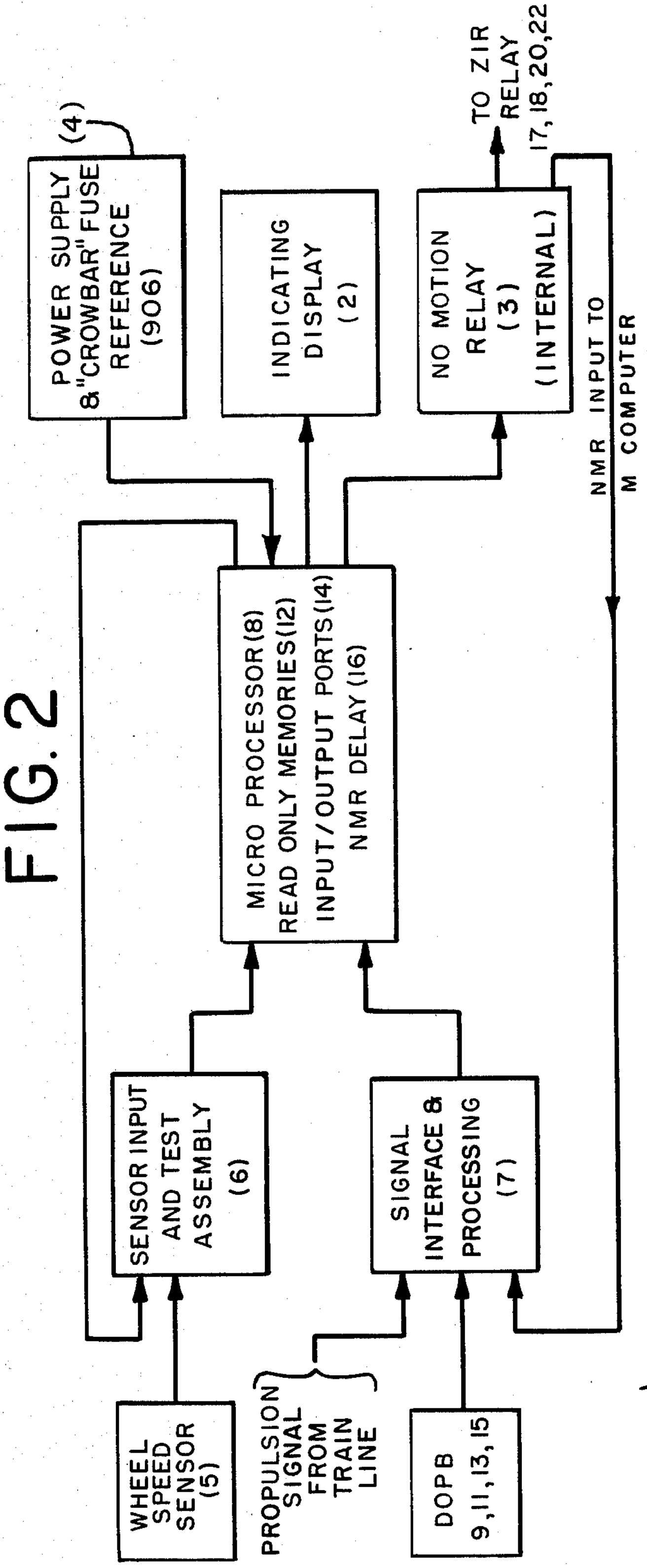
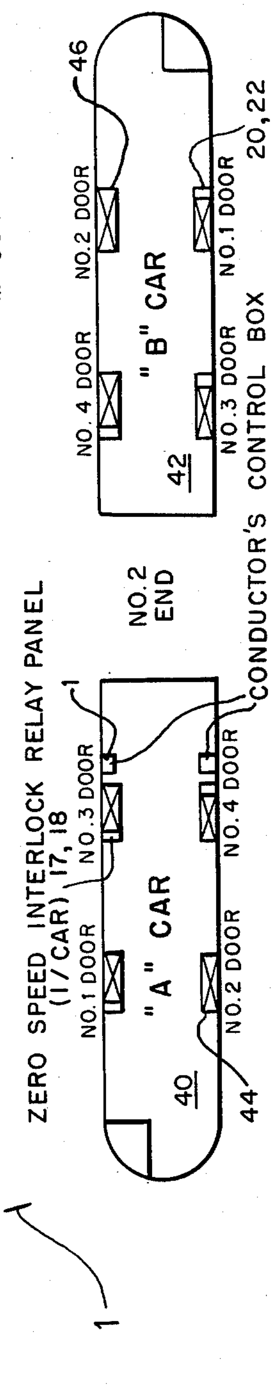
FIG. 3

FIG. 4
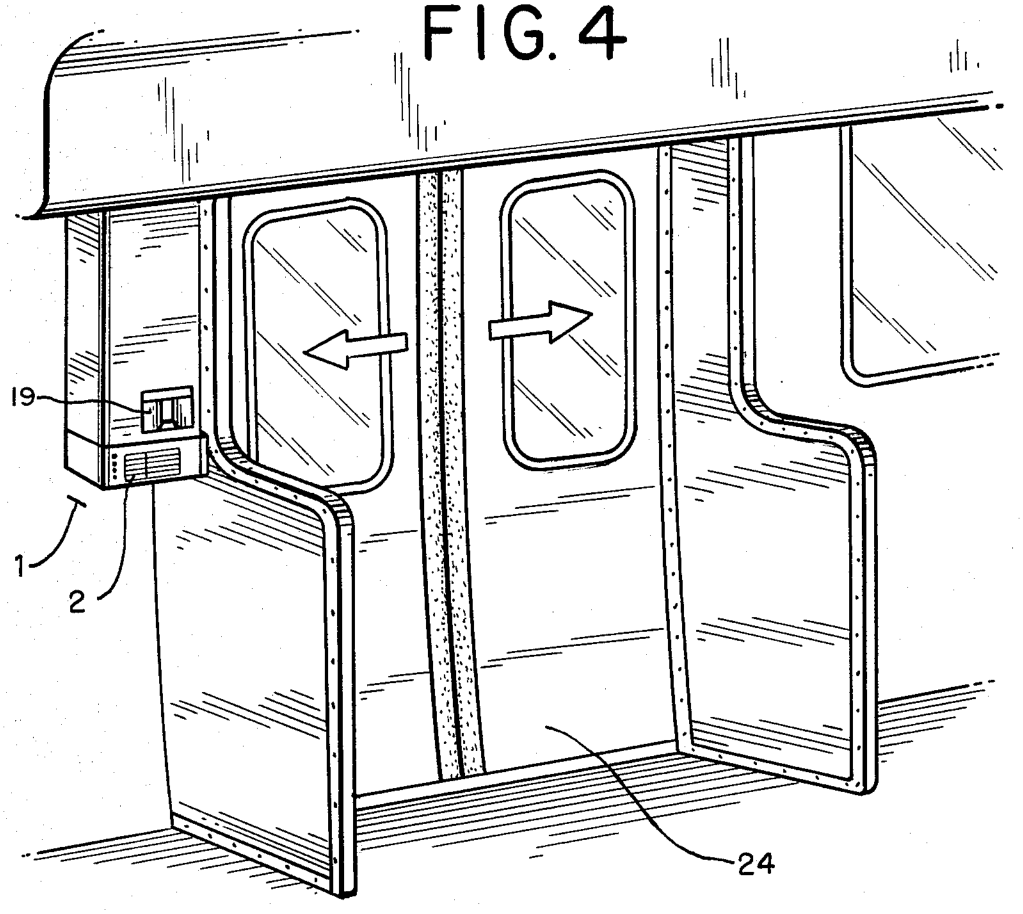
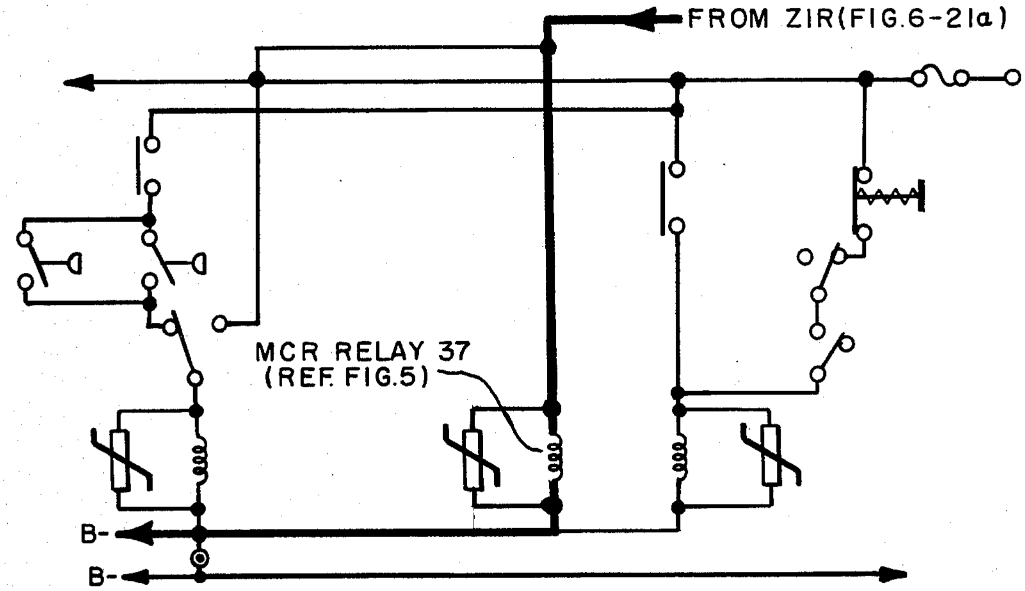
FIG. 7

DOOR CONTROL CIRCUIT
(TYPICAL - ONE DOOR)

DOOR CONTROL SYSTEMS

BACKGROUND OF THE INVENTION

This invention relates generally to door control systems and more particularly to door control systems utilized in mass transit vehicles having power operated doors, wherein it is necessary to accurately determine vehicular speed in order to properly open and close doors in order to insure passenger egress and ingress. Present systems in use are somewhat exemplified by the system disclosed in U.S. Pat. No. 2,637,009. The specification of which is hereby incorporated by reference. Wherein, in a multiple car train, operation of each door is controlled via signals from propulsion equipment and individual relays located in each door circuit. This method of door control, while providing somewhat improved performance in that each door must be closed and a propulsion signal available in order to allow the train to move, suffers from certain shortcomings. Additional door control systems involving operative vehicular interlocks are contained in U.S. Pat. Nos. 1,906,694, 2,096,043, and 1,849,516. Typical door control circuitry is also disclosed in U.S. Pat. Nos. 3,537,403, 1,906,699, 1,849,516, 3,537,403, and 3,782,034. Specification of these U.S. patents are hereby incorporated by reference.

A major shortcoming of these approaches is the ambiguity inherent in the propulsion signal and difficulties in relating car motion to the door control signal. Also possible malfunction of the individual door relay sometimes called a door control summary relay can greatly reduce system reliability. In view of the consequences of premature door opening and/or closing during rapid transit vehicle operation, there has been a substantial need for a system wherein additional checks relative to vehicle speed and condition of the propulsion system are utilized in order to more accurately determine the condition of a given vehicle and/or train prior to any door operation. Additionally, in present systems, possible electrical failures indicating incorrect door vehicle operation information have heretofore been essentially undetectable, resulting in a need for close attention by transit vehicl operators. This requirement, as in the past, resulted in reducing overall effectiveness of the door control system and increasing operation times, a highly undesirable occurrence in todays modern rapid transit systems.

Providing accurate determination of vehicular speed has also been a substantial problem with past systems. Due to the design of speed detectors, exact determination of vehicular speed due to wheel rotation has been subject to substantial error, thus substantially reducing the effectiveness of what is perhaps the best means for allowing doors to open, or in the alternative, closing open doors on start-up.

The invention disclosed here provides an improved control system and method for actuating doors which utilizes, on a time based sample basis, a number of vehicular "state" indications in addition to wheel rotation. Sampling is cyclically repeated in periods chosen to increase the reliability of door control operation.

Accordingly, it is an object of this invention to provide an improved door control system having motion and propulsion signals combined with time based checks for vehicular propulsion to enable door operating sequences.

It is a further object of this invention to provide door controller which utilizes various self-checking techniques to minimize incorrect door operation due to equipment failure.

It is a still further object of this invention to provide a door control system for mass transit vehicles wherein utilization of speed signals in combination determine through recycled logic, a most appropriate time to enable door opening and/or closing.

BRIEF DESCRIPTION OF THE DRAWINGS

FIG. 2—A functional block diagram showing salient signal flows internal of the Low Speed Detector and No Motion Relay.

FIG. 3—Pictorial semi-schematic drawing of "typical" "A and B" car layout showing approximate physical location of major components of the disclosed invention.

FIG. 4—"Typical" door installation in a mass transit vehicle showing location of the power operator, door control panel and low speed detector.

FIG. 7—Further "typical" door control circuitry showing connection of an individual door motor control relay. Accented/bold circuits as in FIG. 5.

SUMMARY OF THE INVENTION

In accordance with the invention a control system is disclosed providing improved operation of power operated passenger doors in a mass transit vehicle. In operation, the controller of the invention provides continuous monitoring at a rate of approximately 1000 cycles per second, of the vehicle wheel speed, a signal or indication of propulsion, and absence or presence of manual request for door opening. Under prescribed conditions for each of the above factors, the system provides for manual opening and/or closing of the vehicular doors. These prescribed conditions for door opening include a wheel speed indication of more than a qualified "zero", and less than some pre-determined speed (typically 2.9 mph), the absence of a demand for vehicular propulsion, and the absence of a door opening signal.

Figure 8:
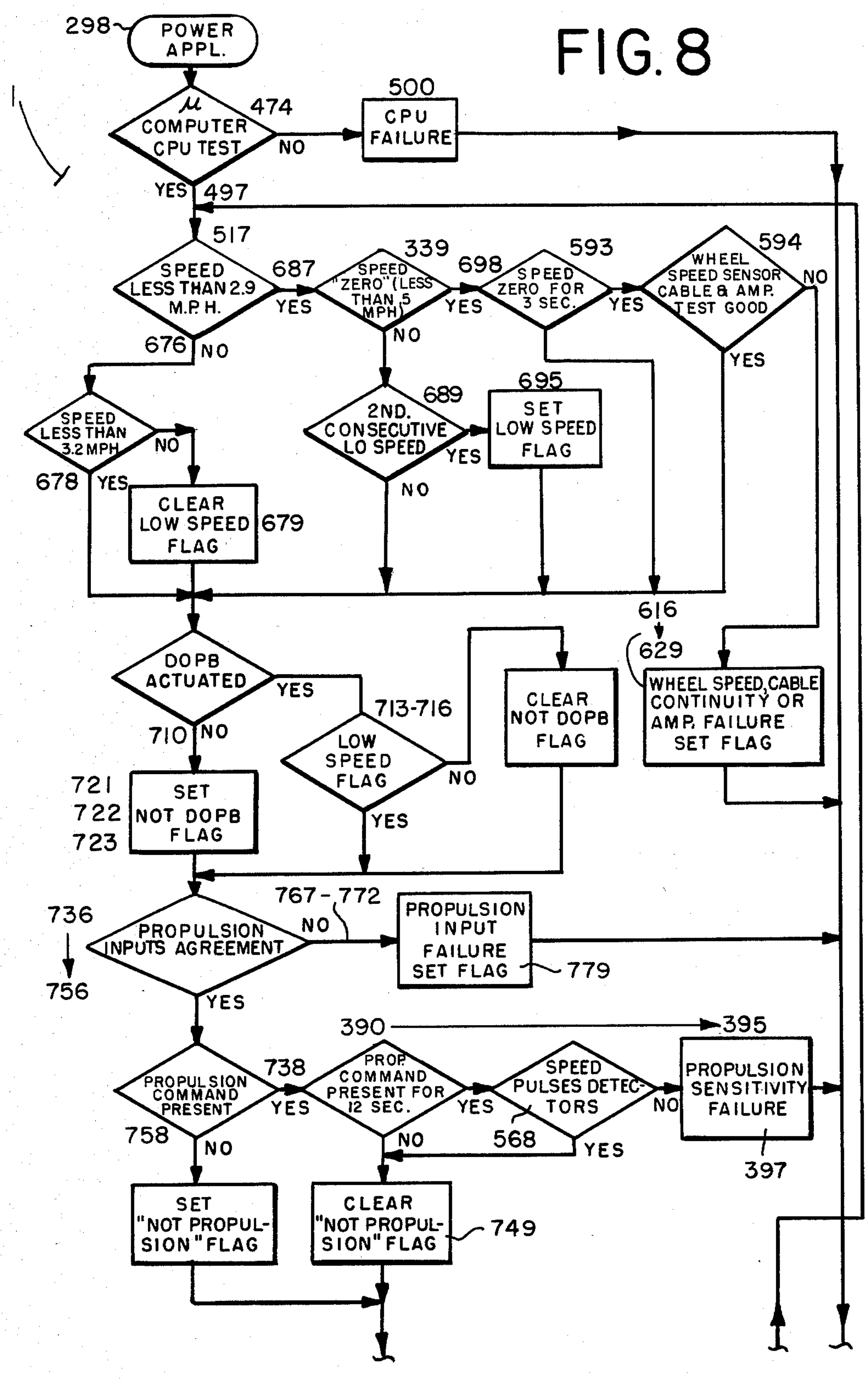
FIG. 8—Initial portion of an operational flow chart for the "low speed detector" of the invention, indicating internal operating sequences and the enabling means or "no motion relay" (NMR).
Figure 8A:
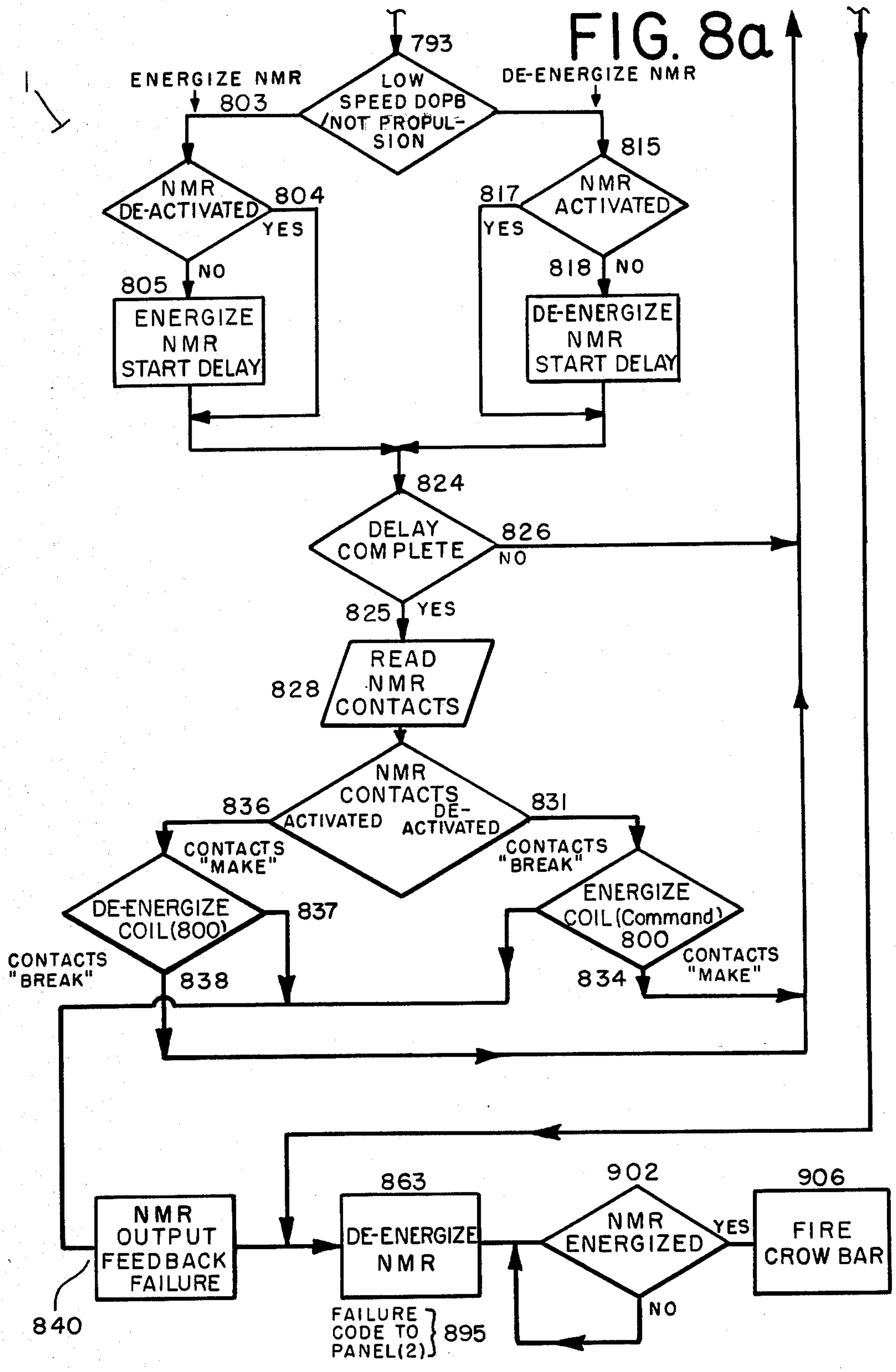
FIG. 8*a*—Second and final portion of the flow chart of FIG. 8.

In a preferred but not limiting embodiment of the system disclosed, utilizing micro-processor techniques well-known to those skilled in the art, the low speed detector 1 (ref. FIGS. 2 and 8) conducts a cyclic series of functional tests in order to determine the operability of the overall door control system. This sequence of tests, as indicated in detail on FIGS. 8 and 8*a*, along with the above mentioned vehicular operating information, conducts a series of at least six equipment operational checks shown on the above mentioned FIG. 8 and listed below.

The functional statements utilized to program the micro-computer portion of the low speed detector are contained in the Appendix.

The time based, cyclic sequential tests disclosed utilize a pre-selected time of cycle which allows self-checking of system components prior to critical functioning of the system. In this way it is possible to detect equipment failures on a continuous basis, and prior to a door opening operation which, in case of malfunction, would be either improper, interfere with efficient train operation, or result in increased difficulties in loading or unloading passengers.

In a conventional arrangement well known to those skilled in the art, two transit vehicles are arranged in what is commonly known as a "married pair". As indicated, particularly in FIGS. 1 and 3, the doors in "A" and "B" cars are controlled by the system largely centered in the "A" cars. Large trains are made up of "A-B" pair multiples.

Although the disclosed embodiment employs self-propelled "married-pair" cars as described above, the disclosed method of enabling door operation is not limited to self-propelled passenger vehicles. Therefore, the door control system disclosed here fully contemplates application on vehicles such as suburban commuter trains using locomotive traction provided by both diesel and electric prime motors. Therefore, the "propulsion systems" refer to any source of tractive effort, either at the wheel of the vehicle or as applied through drawbar pull, sometimes termed "draft".

The low speed detector comprises a micro-processor unit, typically using an 8035 central processing unit (CPU), a 2716 programmed read only memory (PROM), and (2)8212 input-output ports (I/O) such as manufactured by INTEL or equivalent.

DETAILED DESCRIPTION OF THE INVENTION

Figure 1:
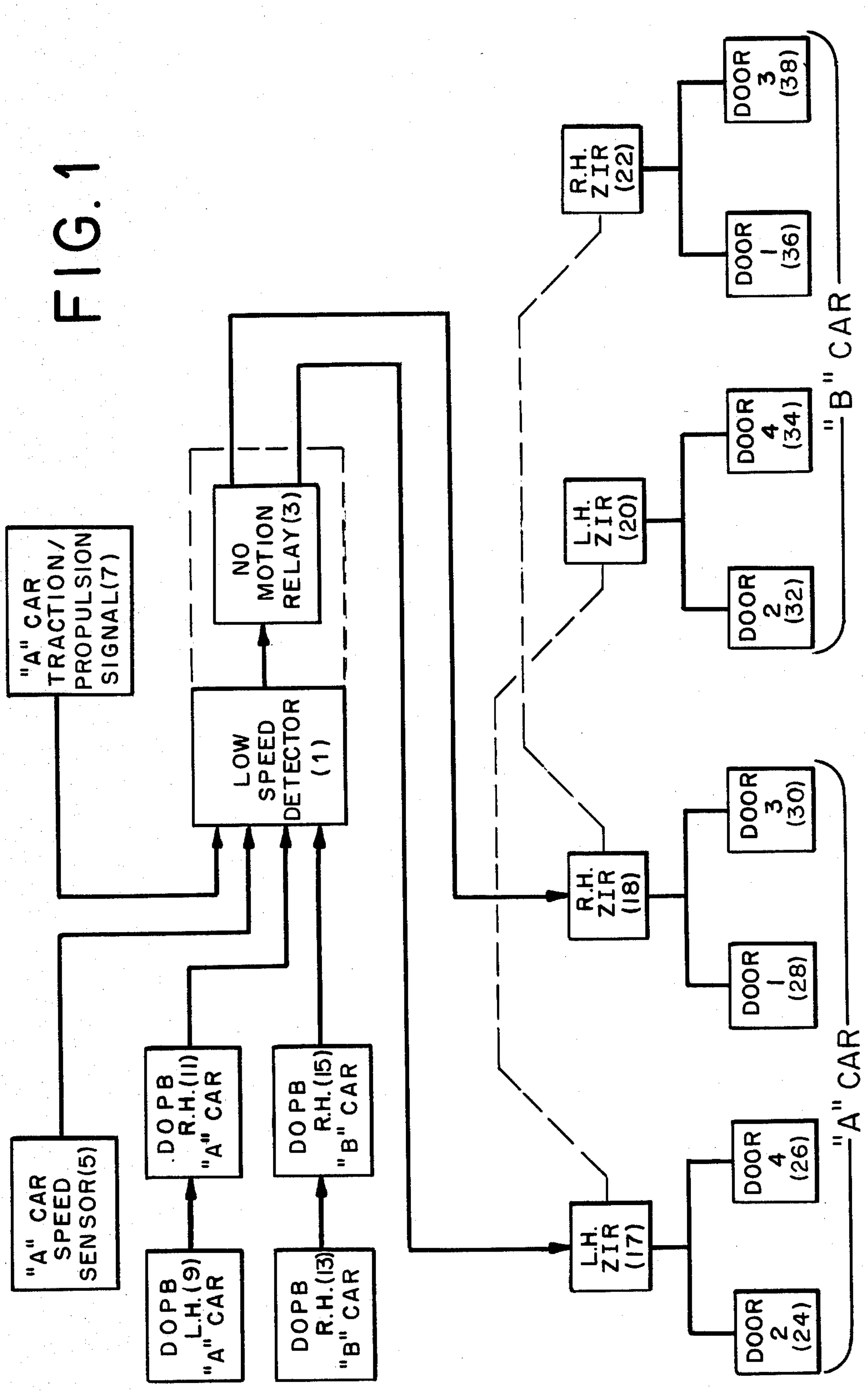
FIG. 1—Block diagram showing a signal flows for major functional elements of the system.

Operation of the disclosed system is initially best understood by initial reference to functional diagram contained in FIGS. 1 and 2.

Although the door control system of the disclosed embodiment which will be described in detail below utilizes an electrically powered door actuator, other forms of door actuators are contemplated by the invention as well. Therefore, the control system disclosed can be utilized and adapted by those ordinarily skilled in the art to hydraulic, pneumatic, or any other sources of controllable power employed to move any type of door between open and closed positions.

Figure 6:
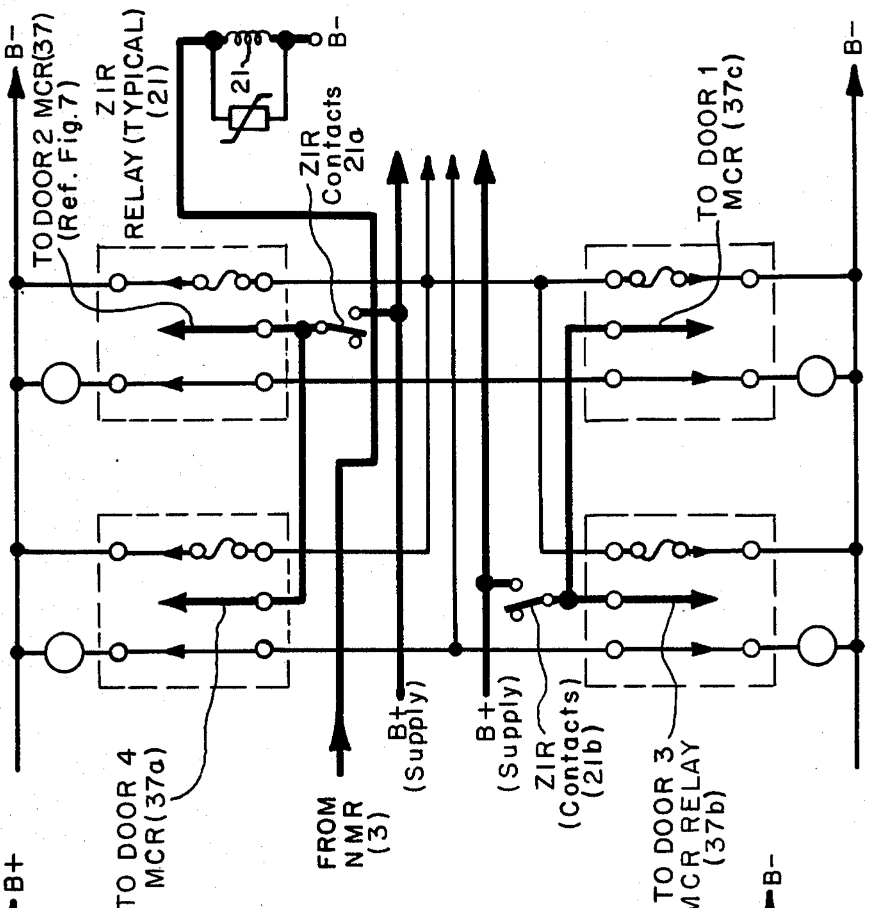
FIG. 6—Additional "typical" door control circuitry particularly showing inter-car connections and in particular the zero speed interolock (ZIR) relay utilized in low speed detector circuitry. Accented/bold line circuits as in FIG. 5.

As shown, operating signals from car wheel speed sensing element 5, traction signal/source 7, and the door open push button (DOPB) contained in both (A) and (B) cars, are supplied to low speed detector 1. The detector, as discussed above incorporates novel time based self-checking features which will be discussed in detail below. At this point, however, it is important to note that on completion of all sampling checks, the functional result is obtained through control of the output element of low speed detector 1, a no-motion relay 3. As indicated in FIGS. 1 and 6, the no-motion relay enables operation of either left hand doors of the (A) and/or (B) cars as determined by operation of the DOPB 9, 11, and/or 13, 15. Enablement by the no-motion relay (NMR) 3, in sequence enables operation of the appropriate zero (speed) interlock relay (typically, ZIR 21, 21*a*) indicated functionally as 17, 18, 20, or 22 in FIG. 1, and in the "typical" circuit of FIG. 6 as 21. As shown in FIG. 1 and FIG. 3, ZIR's (21, 21*a*) are located in each car and represent, as shown in the circuitry of FIGS. 6 and 7, the actuating means for the door operating motor armature 36, reference FIG. 5, through supplying the power through ZIR contacts 21*a* and 21*b* thereby energizing MCR relay 37 (Ref. FIG. 7).

Figure 5:
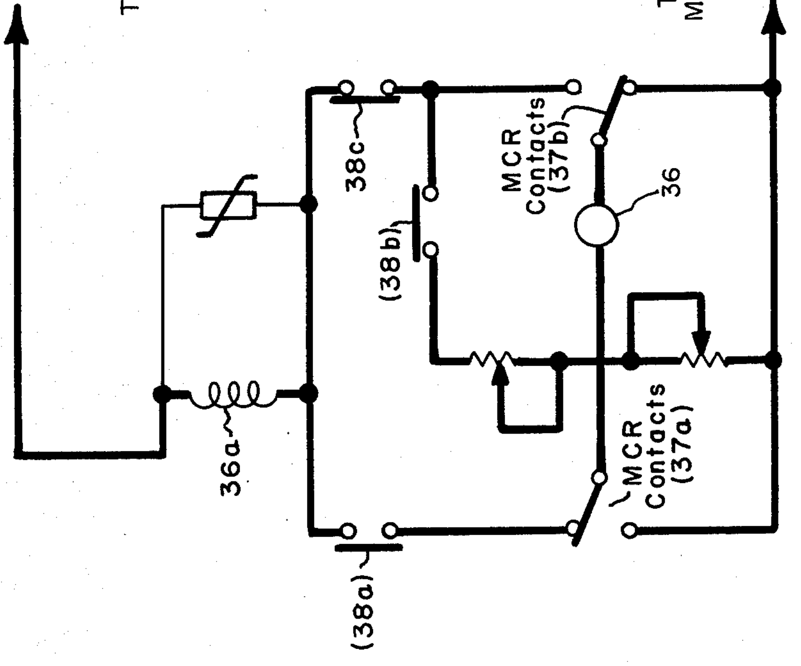
FIG. 5—"Typical" door operator motor circuitry showing door control limit switches and associated motor control elements for a single door. Accented or bold lines indicate circuitry directly concerned with the invention.

With particular reference to FIGS. 5, 6, and 7, "typical" transit car circuitry involving the door control systems are shown. As this circuitry does not constitute a part of the disclosed invention, inclusion is only for the sake of completeness. Therefore, only "salient" portions of the circuitry which involve control of the doors through the invention end element, i.e., the no-motion relay (NMR) 16 are shown. In order to facilitate disclosure, (those skilled in the art will easily understand) the above mentioned salient circuitry is disclosed in bold or accented lines while supporting and less important circuit elements such as connection type points, fuses, transient suppression diodes, are shown in light relief. Thus, circuit tracing by those skilled in the art will be directed to car circuitry associated with the invention disclosed.

FIG. 5 discloses typical single door motor actuator circuitry wherein the contacts of motor control relay (ref. 37-FIG. 5) contacts 37*a* and 37*b* are utilized in conjunction with limit switches 38*a*, 38*b*, and 38*c* located on the door actuating mechanism (not shown), to provide opening and closing operations of a typical transit car door set (ref. FIG. 1), i.e., doors 24, 26, 28, or 30.

As shown in FIGS. 3 and 4, a typical transit car application consists of sliding bi-parting doors 24 and as further shown in FIG. 3 doors are located at two locations on either side of each car. Returning to FIG. 4, the low speed detector 1, and its associated panel 2, as shown located adjacent to the door control station 19 and door set 24.

Returning to the circuitry of FIGS. 5, 6, and 7, the no-motion relay 3 supplies power to the coil of a zero (speed) interlock relay (ZIR) 21 as shown. Contacts 21*a* and 21*b*, of the ZIR relay, energize a MCR relay 37 and associated contacts 37*a*, and 37*b*, which as shown in FIG. 5 provides either open or closed door operations. It should be noted that as those skilled in the art will readily understand, each individual door set, i.e., left or right hand pairs, incorporates its own MCR (37) relay.

Therefore, as those skilled in the electric circuit arts will further recognize, utilization of the end element of the invention, the no-motion relay 3, is supervisory to operation of individual car doors. Therefore, initiation of car door operation via the controller 1 through actuation of the door open push-button 9, 11, 13, or 15, door operation in accordance with the invention is achieved.

Operating under control of the low speed detector (LSD) 2 and the NMR 3, door operation is enabled through pre-selected combinations of car speed, car propulsion, and a manual request for door actuation.

As indicated above, other functions are contained in the low speed detector (LSD) 1, greatly enhancing the function of the overall door control system and providing a substantial advance in the state of the art of door control systems. Chief among these functions are a series of six internal operational checks (Ref. FIG. 2) on the micro-processor 8, programmed read only memory the second consecutive such speed, the low speed flag would not yet be set. This essentially forces a second pass through the system establishing additional reliability of the low speed sensing.

If the indicated car speed is "zero", a check for counts, i.e., pulses from the wheel speed sensor (5) indicating speeds less than 0.5 miles per hour for three seconds is accomplished in 593. Assuming the speed is held for three seconds, at 594 an operation check on the wheel speed indicator (5), and its associated amplifier and inter-connecting cables is performed. These tests include connecting cable continuity, wheel speed sensor resistance, and amplifier frequency response.

It should be noted that the three second check period provides for attainment of speeds low enough to prevent generation of current by the wheel speed sensor which would interfere with the subsequent electrical test.

Returning to FIG. 8, at the 517/676 test for speeds less than 2.9 miles per hour, an additional test at 678 tests for speed greater than 3.2 miles per hour; therefore, in a situation where indicated speed excess of 2.9 miles per hour might be less than 3.2 miles per hour, the low speed indication is unaffected. These two tests are essential in that possibilities for variation in speed sensor speed pulses, gear back lash, and wheel/gear eccentricity can combine to "loop" the system around a single given speed. Therefore, it has been found necessary to provide "hysteresis" which is a substantial factor in stabilizing the system and providing consistant indications for proper door operation.

In the event that a speed of 3.2 MPH, or greater, is detected, the low speed flag is removed at 679.

At test 593, assuming the prior indicated "zero" speed were not maintained for three seconds, program operation would bypass the sensor, cable, and amplifier test of 594. At test 594, in the event that tests of the speed sensor, cable, and amplifier are unsatisfactory the program proceeds to 863, where a no-motion relay is de-energized and subsequent tests discussed above are conducted to again inhibit door operation. A flag indicating failure is set in 615–629.

Upon completion of the above wheel speed functions, operation continues with testing of the door open push button (DOPB) signal or operating any one of switches 9, 11, 13, 15 at 710. De-actuation, i.e. opening a normally closed switch, is a function of the continuous current circuitry employed. In use, failure of any component in the DOPB circuit carrying current will be detected since a door opening signal out of sequence will fail subsequent tests.

If the signal indicates de-actuation of the DOPB, i.e. a requirement for door opening, a "NOT-DOPB" flag is set for subsequent test at 793. If the signal indicates actuation of the DOPB, a further check is made, at 713, of the low speed status. If the vehicle speed is above "low speed", the "NOT-DOPB" flag is cleared at 715. As can be seen in the logical flow of this operation, continuous actuation of the DOPB, while the vehicle is decelerating from a "high speed" to a "low speed", will pre-empt the setting of the "NOT-DOPB" flag which in turn will inhibit door operation via the subsequent test at 793. Since operation of the DOPB must accompany a low speed condition on each program sequence to initiate the "energize NMR" phase at 793/803. Those familiar with mass transit operation will recognize the desirability of this feature as it prevents the "automatic" opening of doors at attainment of low speed should the DOPB be "plugged" or otherwise artificially maintained in the actuated or "door open" state resulting in a substantial improvement in passenger handling and door system reliability.

Continuing with the operation, the propulsion input signal is sampled 734 (reference Appendix program). At the signal interface 7, the propulsion signal is applied to two identical legs of a redundant signal processing circuit. If the results of these redundant circuits are not identical, a malfunction may have occurred at 767. To allow for variations in response times for the two circuits a temporary flag is set and a delay of ten "program loops " is introduced (772) before action is taken. If the two results are reconciled before the completion of the delay, the temporary flag is cleared and the delay process is terminated 764 (reference Appendix program) in preparation for possible invocation at a later time.

If, however, the delay proceeds to completion (also program) the discrepancy is recognized as a circuit malfunction and appropriate action is taken (863) by disabling the NMR as previously described.

When the two circuits give identical results, these will indicate either propulsion or not-propulsion. In the case of "not-propulsion", a flag will be set establishing a "not-propulsion" indication (758) for subsequent testing at 793. In the case of propulsion, not only will the "not-propulsion" flag be cleared (749), but a further test will be performed that checks for the transistion from not-propulsion to propulsion (738). The transition (or vehicled start-up) begins a delay sequence of approximately 12 seconds (741 program and 390–395) to allow sufficient acceleration of the vehicle to detect wheel pulses. If, during the 12 second delay, speed pulses are detected, the delay sequence is terminated (568). If, however, no speed pulses are detected and the delay proceeds to completion, a malfunction has occurred. A speed sensor sensitivity failure is indicated (with pickup sensitivity failure code—FIG. 9) (397) and the NMR is de-energized (863) as described earlier.

Continuing on in the sequence, at 793 a comprehensive check of information (i.e. flags) developed earlier regarding proper low speed, lack of door opening push button signal, i.e., actuation of the DOPB switch, and no propulsion is conducted to insure that all three situations are present. Assuming a positive result, at 803 a signal to energize the no motion relay 3 is developed-)i.e., coil command at 800) and the relay itself is tested for operation via 824–838.

It should be noted that the extremely high cycling speeds of this portion of the system operate well inside the operating time of the no-motion relay 3 and, therefore, at 805 and 818 it is necessary to establish a delay as indicated in FIG. 2 at element 16, to provide additional time for relay contacts to operate. Therefore, recycling through 824–838, and back to 517, returning to 803 until the delay terminates before checking the status of the NMR contacts. After maintaining the appropriate control signal for the NMR coil, (at 805 or 818) an additional check for termination of the delay is conducted at 824 and 825, which if successful, moves the program to 828. Step 828 provides an indication of contact status in the no-motion relay 3 as signified on FIG. 2 by the functional connections between blocks (3) and (7). Further, testing of the NMR contacts for either pick up or drop out action is conducted at 831 and 836 respectively. Alternately, failure of NMR contacts to "make" establish an output failure at 840 with attendant failure code at 895. This provision signals a "non opening"

12, and input/output ports 14, as components of the low speed detector. As indicated in FIG. 8, and Appendix, the following series of system checks are cyclically performed;

1. A microprocessor (8) self test.
2. Continuity test of speed sensor (5) and associated circuitry.
3. Speed sensor amplifier (6) test.
4. Speed sensor (5) sensitivity test.
5. Redundant propulsion signal input circuit check.
6. NMR (3) output/feedback test.

These tests are described in substantial detail, along with micro-processor operating instructions corresponding to the block diagram tests in FIG. 8. The micro-processor program is described in detail by the Appendix. Those ordinarily skilled in the micro-processor art will readily understand the functional aspects of overall system of FIG. 8 and further operationally tabulated in the Appendix.

To enhance the disclosure, a detailed description of salient functions keyed to micro-processor instructions follow hereinafter. It should further be noted that the Appendix program conforms to ISIS-II MCS-48/UPI-41 macro-assembler, a system well known to those skilled in the micro-processor arts.

Functional operation of the LSD 1, (ref. FIG. 2) is best understood by following the sequences shown in FIGS. 8, and 8*a*. It should be again noted that the numerical representation in or adjacent to the functional operating blocks correspond to the line numbers of the micro-processor operating program contained in the Appendix. As indicated earilier, those skilled in the art will recognize the format. The assembly language manual defining the programming language is INTEL manual #9800255.

Beginning at 298 on initial start-up, power is supplied to the entire door control system initiating operation of the central microprocessor unit 8. A prescribed test (500) checks for "bare minimum" operation which includes the micro-processor and associated memory. This testing establishes a minimum or "kernel" function. End points of this test are 497 for successful CPU function, and 474 for a test failure. In the event of a CPU malfunction, the NMR(3) would be de-energized at 863.

A failure code is then displayed on the system operating panel 2 at 895.

Additional NMR testing occurs at 902 in order to insure de-energization of the no-motion relay and non-enablement of the door system. The 902 test includes a group of sequential operations on the contactor to insure relay dropout or contact opening. In the event of a welded contact or other malfunction that would allow improper enablement of the door system, at 906 a "crow bar" is utilized to supply excessive current to a fuse contained in the power supply module 4. Opening of the crow bar fuse removes electrical power from the entire system and provides failure indication on the panel indicating display 2 requiring action by an operator.

It should be noted that the sequence 863, 895, 902, 906, is repeated for all test failures to be described below. Therefore, in order to avoid excessive and redundant description, the operation 863 will be described as to a low speed detector failure.

A major feature of the disclosed invention is the utilization of high speed electronic logic and associated circuitry to provide a highly reliable electro mechanical contactor wherein electronic circuitry augments a high quality electro mechanical contactor. This synergistic combination provides reliability of a much higher order of magnitude then either the circuitry and/or contactor alone. Conventional "highly reliable" contactors employ mechanical and electro mechanical designs for use in vital circuitry, through "inherent" physical characteristics. These inherent characteristics include gravity actuation of an armature in returning to a predetermined position, massive magnetic coils wherein failure due to thermal expansion and contraction is minimized, and contact material wherein certain arc handling and current interrupting features have been found to reduce the probability of failure through welding.

Although the concepts of "vital" circuitry and associated "vital" components are allied with safe and fail-safe operation of the circuitry, an exact correlation is difficult to establish. Operation of safe and/or "fail-safe" circuits imply reversion to operation having a least dangerous function or state. Therefore, although exact definitions do not exist, the concept of a conservative state can be used to define a least dangerous state. Consequence of improper door operation establishes the circuitry and objectives of the invention disclosed here as "vital", and therefore reversion to a conservative state can be considered to imply cautious or "least dangerous" modes of operation.

The above mentioned designs, while providing reasonably increased reliability, result in electro magnetic devices which are large, heavy, and substantially increased in cost. Therefore, in many cases, contactors of this type are not utilized due to the aforementioned disadvantages. In contrast, the approach provided by portions of the disclosed microprocessor control, beginning at 73 and ending at 906 provide a relatively low cost moderately sized device which incorporates all of the characteristics of the above "inherently highly reliable" device.

As disclosed the electronically augmented contactor provides frequent and repititious checks on major failure modes of an associated electro magnetic contactor. The combination, therefore, provides the synergistic combination at moderate cost and a reasonable size, thereby enhancing the probabilities of its being incorporated in equipment, and making highly reliable equipment available to designers without substantial penalties imposed by the above mentioned "inherent" devices.

Returning now to 497, signifying a successful central processing unit test. The program at 517 tests for car speed less than 2.9 miles per hour. It should be pointed out that those skilled in the art will recognize that the speed tested for, as well as other numerical constants disclosed herein, is "programmable" and may vary depending on the particular embodiment of the invention. Car speed indications less than 2.9 miles per hour, proceed to a check for speed "zero" at 339. It should be noted that the term "zero" is qualified to include indications from the car speed sensor 5 less than 0.5 miles per hour, due to the unreliability of wheel speed sensors at very low speeds.

Continuing on in the functional program: at test 339, assuming that speed were in excess of 0.5 miles per hour, a second test at 689 would be applied so as to check for a second consecutive low speed. Assuming that on re-cycling, two consecutive speeds above 0.5 miles per hour but below 2.9 miles per hour were encountered a low speed flag would be set at 695, thereby establishing a low speed indication for the subsequent test at 793. In the alternative, assuming that the indicated speed between 2.9 and 0.5 miles per hour was not failure in the controller end element on panel 2, for appropriate action by train operating crews.

Assuming pick up of the NMR (3) is desired, the 831 leg proceeds to further check for presence of a coil command provided earlier by the low speed, door open push button, and propulsion checks at 793. Assuming a positive result at 834, operations return to 517, reinitiating the entire cycle beginning with the low speed check.

It should be noted that the above description assumed that all requirements for door opening were present, and terminated in enabling the door opening via the ZIR (21) contact, i.e., elements 17, 18, 20, and 22 in the appropriate cars. As indicated earlier, and shown in FIG. 3, actuation of the door opening push button in a train attendant is accomplished for either one side of the car or the other. Thus, in the above example assuming a pair of "A" and "B" cars either elements 28, 30, 36, and 38, or 24, 26, 32, and 34 would be enabled and opened for passenger traffic.

Returning to the above discussed operating sequence and FIG. 7, a particularly useful and novel function is included involving the "crow bar" 38 actuated by the system in the event of failure to control the operation of the NMR. In one sequence of operations (reference FIG. 8) assuming that at 594 testing of the speed indicator and associated equipment have been unsuccessful at 616–629, indication of this failure is noted and stored and the program proceeds to 863. In keeping with the major thrust of this invention, the primary enabling element, that is the no-motion relay 3, is to be de-energized in order to prevent improper door opening. 863 also provides for the failure indication code to the operating panel 2 providing convenient diagnosis of the specific failure for action by the operator.

At this point it is still possible for the end element, i.e., the no-motion relay to remain energized due to mechanical or a combination of electrical and mechanical failures. Therefore, at 895 a delay is conducted for a sufficient length of time to insure that the rapid program cycle has not indicated failure due to the slow drop out time of the relay. Assuming this built in time delay is exceeded, and the feedback monitoring loop (902) indicates closed NMR contacts, at 906 the "crow bar" 38 is operated or fired. As indicated above, operation of the "crow bar" potentially shuts down the entire door system and provides indication of the shut down on the panel 2 since as shown "NO LED's ON POWER LOSS" is displayed.

A further novel and advantageous feature of the invention involves availability of quick diagnosis of system failures other than the above described NMR remaining energized in the absence of prescribed car operating requirements. A diagnostic code provides a series of unique indications by light emitting diodes or other display lamps on the control panel 2.

In operation, the failure code is initiated for each test not resulting in a successful outcome. These include: at 616–629, the speed input and associated equipment; the propulsion inputs at 779, and possible failure in the no-motion relay at 842. Therefore, using the panel shown in FIG. 8, it is possible for train attendant to quickly determine the source of difficulty and act accordingly. Those skilled in the mass transportation field will readily recognize that under the operating conditions present in train operation, availability of this kind of system will greatly improve car reliability and decrease the possibility of improper door opening.

An additional advance in the door control art provided by the invention improving the utilization of a micro-processor, is provided by the "power-on" test of the central processor. This feature insures that prior to any door enablement the probability of failure of the CPU and associated memory is greatly reduced. In particular, the test sequence contained in the power reset system test, lines 412 to 472 of Appendix, result in frequent and regular tests of the microprocessor function.

On initial power turn-on, the NMR will be energized given the speed indication of zero miles per hour as opposed to a speed less than 2.9 miles per hour maximum, on satisfactory completion of the tests indicated earlier. This "lack" of speed signal will result in a valid low speed indication only until the first speed pulse is detected. From that time on, the speed requirements are set forth earlier dictate the status of the low speed indication.

Remaining system functions shown in the loops, while not described in the detail utilized above, will be readily understood by those skilled in the art. Complimentary tests, disclosed by correlation of the functional flow diagram with indicated steps in the program disclosed in the appendix, can be easily followed.

Certain novel aspects of the above system-check features provided by the LSD (1) are described below.

Utilizaton of a micro-processor and associated programmable memory devices in a novel combination with elements of car propulsion and power door operating equipment provides additional and novel advantages in door control. In particular, high speed repetitious functional "validity" checks of both car operating conditions and associated input and interface devices provides substantial improvements in overall system reliability and further provides detection of possible hazards to passengers prior to door operation. These novel functions, although somewhat inter-related can be distinguished as:

1. Functional interrogation of the overall system, assuming proper component operation.

2. Functional tests independent of car operating functions of system components at the predetermined time relationship with car functions indicated above so as to provide clear indications of failure prior to door operation.

Figure 9:
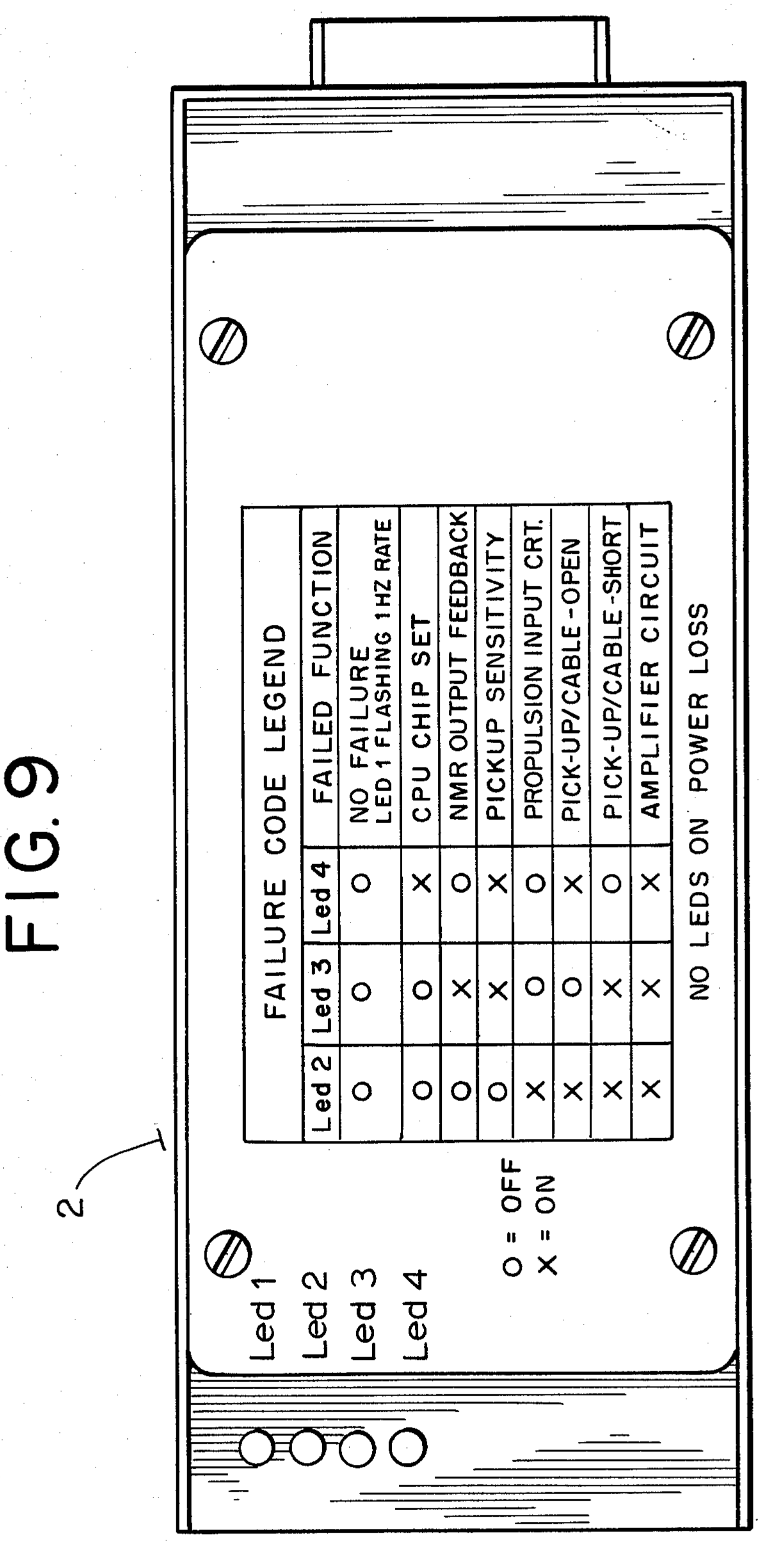
FIG. 9—Detailed plan view of the Low Speed Detector package particularly showing operators panel and diagnostic failure code.

These predetermined failure modes are clearly indicated (ref. FIG. 9) on the low speed detector panel indicating display 2. As shown, the series of four indicators provide rapid diagnosis of system malfunction at any time. The panel and indicators 2 are located as shown in FIG. 4, prominently displayed on the conductors door control panel.

Thus it is apparent that there has been provided, in accordance with the invention, a system for controlling power operated doors for transit vehicles, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

APPENDIX

```
ISIS-II MCS-48/UPI-41 MACRO ASSEMBLER, V3.0
LOW SPEED DETECTOR  06/12/80

LOC  OBJ        LINE        SOURCE STATEMENT

$       TITLE(' LOW SPEED DETECTOR  06/12/80  ')

;
; -----------------------------------------------------------------
;
;       THE BASIC FUNCTION OF THE ELECTRONIC LOW
;       SPEED DETECTOR (LSD) WILL BE TO SUPPLY A
;       SET OF RELAY CONTACTS TO THE DOOR CONTROL
;       SYSTEM MEETING THE FOLLOWING REQUIREMENTS:
;
;       THE RELAY CONTACTS WILL CLOSE ( TO ALLOW
;       DOORS TO BE OPENED ) WHEN THE LSD DETERMINES
;       THAT THE CAR IS TRAVELLING AT A VALID "LOW
;       SPEED" AND THE PROPULSION COMMAND AS SENSED
;       FROM A TRAINLINE INDICATES THE ABSENCE OF
;       SUCH A PROPULSION COMMAND, AND THE DOOR
;       OPEN PUSH-BUTTONS ARE SENSED AS BEING DE-
;       ACTUATED.
;
;       ONCE THESE CONDITIONS ARE MET AND THE
;       OUTPUT RELAY (NMR) IS ENERGIZED, ANY
;       OF THE FOLLOWING CONDITIONS WILL CAUSE
;       THE NMR TO DROP OUT:
;               1) PRESENCE OF A PROPULSION COMMAND
;               2) DETECTION OF SPEED ABOVE "LOW SPEED"
;               3) FAILURE WITHIN THE LSD SYSTEM
;
;       A VALID "LOW SPEED" IS DEFINED AS FOLLOWS:
;
;       UNDER NORMAL OPERATING CONDITIONS THE
;       LSD MUST DETECT A SPEED OF 2.9 MPH OR LESS
;       YET ALSO GREATER THAN 0 MPH.  TO 'LEAVE'
;       THE VALID "LOW SPEED" REGION A SPEED OF
;       3.2 MPH OR GREATER MUST BE DETECTED...THERE
;       IS A HYSTERESIS OF 0.3 MPH.
;       THESE SPEEDS ARE BASED ON THE WORST CASE
;       MAXIMUM WHEEL OF 28 INCH DIAMETER, AND ARE
;       NOT AFFECTED BY THE SPEEDS ENCOUNTERED
;       DURING THE SELF-TEST MODE DESCRIBED LATER.
;
;       THE ONE EXCEPTION TO THIS "LOW SPEED" RULE
;       IS THAT ON INITIAL POWER TURN-ON, A SPEED
;       OF 0 MPH WILL BE ACCEPTED AS A VALID SPEED
;       BUT ONLY UNTIL THE FIRST NON-ZERO SPEED
;       IS SENSED.  AT THAT TIME, THE GENERAL
;       "LOW SPEED" RULE WILL TAKE EFFECT.
;
;       THE SELF-TESTING THE LSD PERFORMS IS AS
;       FOLLOWS:
;               1) MODEST CPU SELF-TEST
;               2) SPEED SENSOR & CABLE CONTINUITY
;               3) SPEED SENSOR AMPLIFIER TEST
;               4) SPEED SENSOR SENSITIVITY TEST
;               5) REDUNDANT PROPULSION INPUT CIRCUIT
;               6) NMR OUTPUT/FEEDBACK TEST
;
;       1) THE CPU SELF-TEST IS A MODEST TEST OF
;          THE MICROCOMPUTER THAT CERTAIN ARITHMETIC
;          OPERATIONS CAN BE PERFORMED, THAT
;          INTERNAL DATA STORAGE CAN BE READ AND
;          WRITTEN CORRECTLY, THAT THE TIMER
;          FUNCTIONS CORRECTLY ( FOR TIME-BASE
;          GENERATION ).  ALSO A FAILURE WILL
;          OCCUR IF THE CPU DETECTS AN EXTERNAL
```

```
;               INTERRUPT REQUEST - DOES NOT EXIST
;               IN THIS PRODUCT.
;
;            2) THE SPEED SENSOR & CABLE CONTINUITY TEST
;               IS TWO-FOLD.  THE TESTS PERFORMED ARE FOR
;               CIRCUIT OPENS AND SHORTS ( I.E. THE
;               RESISTANCE OF THE SENSOR/CABLE COMBINATION
;               MUST FALL WITHIN A SPECIFIC RANGE ).
;
;            3) THE SPEED SENSOR AMPLIFIER TEST WILL
;               SWITCH INTO THE AMPLIFIER A PRE-DETERMINED
;               FREQUENCY SO THAT THE CPU CAN VERIFY
;               OPERATION OF THE AMPLIFIER.
;
;            4) THE SPEED SENSOR SENSITIVITY TEST IS
;               PERFORMED WHENEVER THE PROPULSION INPUT
;               CHANGES FROM THE ABSENCE OF A PROPULSION
;               COMMAND TO THE PRESENCE OF SUCH A
;               COMMAND.  ITS FUNCTION IS TO VERIFY
;               THAT THE SENSOR CAN INDEED DETECT THE
;               MOVEMENT OF THE GEAR WHOSE TEETH IT
;               IS SENSING.  IF THE CPU DOES NOT
;               DETECT ANY SPEED PULSES WITHIN 12 SECONDS
;               AFTER DETECTING A PROPULSION COMMAND,
;               THE SENSOR IS DEEMED TO HAVE LOST
;               ITS SENSITIVTY.
;
;            5) THE REDUNDANT PROPULSION INPUT CIRCUIT
;               TEST CHECKS THAT BOTH LEGS OF THE DUAL
;               CIRCUIT INDICATE THE SAME STATUS OF
;               THE PROPULSION TRAINLINE.  IF NOT, A
;               CIRCUIT FAILURE HAS OCCURRED.
;
;            6) THE NMR OUTPUT/FEEDBACK TEST IS USED
;               TO VERIFY THAT THE LSD HAS COMPLETE
;               CONTROL OF THE NMR RELAY.
;
;NOTE
;                    THE SPEED CIRCUIT TESTS ( SENSOR &
;                    CABLE CONTINUITY AND AMPLIFIER TESTS )
;                    ARE PERFORMED EVERY TIME THE CAR
;                    DECELLERATES FROM ABOVE 0.5 MPH
;                    ( THE SPEED DEFINED IN THE SYSTEM
;                    AS A "STOP" ) TO BELOW 0.5 MPH.
;
;                    THE REASON 0.5 MPH IS DEFINED AS
;                    A "STOP" IS SOMEWHAT ARBITRARY, BUT
;                    IT IS ASSUMED THAT THE SENSOR WILL
;                    PRODUCE SPEED PULSES ABOVE 0.5 MPH
;                    AND STOP PRODUCING SPEED PULSES
;                    SOMEWHERE BETWEEN 0 - 0.5 MPH, AND
;                    A SPECIFIC RATE MUST BE DETECTED BY
;                    THE CPU TO PERFORM CERTAIN FUNCTIONS
;                    RATHER THAN THE COMPLETE LOSS OF A RATE
;
;
;
;           SHOULD ANY OF THESE FAILURES OCCUR, A CODE
;           WILL BE DISPLAYED ( VIA LED'S ) INDICATING
;           THE MODE OF FAILURE.  IN ADDITION, THE NMR
;           WILL BE DROPPED-OUT, AND CONTINUOUSLY
;           MONITORRED.  SHOULD THE CPU DETERMINE THAT
;           THE NMR IS NOT DROPPED-OUT ( VIA FEEDBACK )
;           A CROWBAR CIRCUIT IN THE LSD POWER SUPPLY
;           WILL TRIGGER AND BLOW THE FUSE FEEDING THE
;           B+ VOLTAGE TO THE NMR COIL, A SET OF NMR
;           CONTACTS, AND THE LSD POWER SUPPLY.
;
;
;           FURTHER DETAILED DESCRIPTION---
;
```

```
;        THE THREE BASIC REQUIREMENTS FOR
;        PICKING-UP THE NMR ( LOW SPEED, NOT
;        PROPULSION, AND DOOR OPEN PUSHBUTTON (DOPB)
;        DEACTUATED ) ARE STORED INTERNALLY AS FLAGS
;        IN THE CPU.  THESE FLAGS BEHAVE AS FOLLOWS.
;
;        LOW SPEED - FLAG SET WHEN TWO CONSECUTIVE
;                    SPEEDS BELOW 2.9 MPH AND ABOVE
;                    0 MPH ARE DETECTED
;                        - OR -
;                    FLAG SET AT POWER TURN-ON
;
;                    FLAG CLEARED WHEN ANY SPEED
;                    ABOVE 3.2 MPH DETECTED
;
;        NOT PROPULSION - FLAG SET WHEN BOTH LEGS
;                    OF REDUNDANT CIRCUIT INDICATE
;                    THE ABSENCE OF A PROPULSION
;                    COMMAND ON THE TRAINLINE
;
;                    FLAG CLEARED WHEN BOTH LEGS
;                    OF REDUNDANT CIRCUIT INDICATE
;                    THE PRESENCE OF A PROPULSION
;                    COMMAND ON THE TRAINLINE
;
;        NOT DOPB -  FLAG SET WHEN THE DOOR OPEN
;                    PUSHBUTTON IS DE-ACTUATED
;
;                    FLAG CLEARED WHEN DOOR OPEN
;                    PUSHBUTTON IS ACTUATED AND
;                    CAR IS TRAVELLING ABOVE "LOW SPEED"
;
;        BECAUSE THE OPERATION OF THE MICROCOMPUTER
;        IS MUCH FASTER THAN MANY OF THE SIGNALS WITH
;        WHICH IT MUST INTERFACE, CERTAIN FUNCTIONS
;        HAD TO HAVE DELAYS INTRODUCED AS FOLLOWS:
;
;        PICK-UP AND DROP-OUT DELAYS FOR THE DIP RELAYS
;
;        PICK-UP AND DROP-OUT DELAYS FOR THE NMR
;
;        A THREE SECOND DELAY FROM A "PROGRAMMED" STOP
;        ( DEFINED IN THE PROGRAM AS 0.5 MPH ) TO ALLOW
;        THE WHEEL TO COME TO A COMPLETE STOP SO THAT
;        VOLTAGES WILL NOT BE INDUCED BY THE SENSOR
;        WHILE THE SENSOR IS BEING TESTED
;
;        A TWELVE SECOND DELAY TO ALLOW THE CAR TO
;        ACHIEVE A HIGH ENOUGH SPEED FROM A STANDING
;        START FOR THE SENSOR SENSITIVITY TEST
;
;        TEN PROGRAM CYCLES ( APPROX. 10 MILLISECONDS )
;        TO ALLOW THE COMPONENTS IN THE LEGS OF
;        THE REDUNDANT PROPULSION INPUT CIRCUIT
;        TO ACHIEVE THE SAME STATUS
;
;
$        EJECT
;
;        THE FOLLOWING IS A TABLE
;        DESCRIBING THE FLAG/REGISTER
;        USAGE THROUGHOUT THE SOFTWARE
;
;        RX = REGISTER 'X'
;        RX-Y = REGISTER 'X', BIT 'Y',
;               ( WHERE Y = 0-7 )
;        RX' = REGISTER 'X' IN SECOND REG. BANK
;
;
;          F0    EOA LEVEL FLAG
;          F1    NEW SPEED AVAILABLE FLAG
```

```
;           R0      BANK 1 (R0'-R7') POINTER
;           R1-0    POWER RESET FLAG
;           R1-1    DIP DELAY FLAG ( 1=PICK-UP)
;           R1-2    EOA TEST PERFORMED FLAG
;           R1-3    EOA TEST IN PROGRESS FLAG
;           R1-4    CONSECUTIVE LOW SPEED FLAG
;           R1-5    "NOT-DOPB" FLAG (1= DE-ACTUATED)
;           R1-6    "NOT-PROPULSION" FLAG(1=NOT PROPULSION
;           R1-7    LOW SPEED FLAG(1= <3 MPH,CONSECUTIVELY)
;           R2      FAILURE MODE REGISTER
;           R3      OUTPUT LATCH VALUE
;           R4      DELAY 3 SECONDS AFTER 0.5 MPH
;           R5         FOR WHEEL TO STOP
;           R6      SPEED STORAGE REGISTER
;           R7      SPEED COUNTER REGISTER
;           R0'-0   STOPPED FLAG (1= "STOPPED")
;           R0'-1   WHEEL DELAY COMPLETE FLAG
;           R0'-2   NMR DELAY COMPLETE FLAG
;           R0'-3   NMR DELAY FLAG (1= DELAY IN PROGRESS)
;           R0'-4   DIP DELAY COMPLETE FLAG
;           R0'-5   PROPULSION EDGE FLAG
;           R0'-6   SPEED COUNTER LIMIT (1= COUNT
;                                         OUT TO ZERO )
;           R0'-7   WHEEL STOP DELAY FLAG
;           R1'     ACCUMULATOR STORAGE
;           R2'     DIP DELAY COUNTER
;           R3'     NMR DELAY COUNTER
;           R4'     GREEN LED 1 HZ
;           R5'        FLASH RATE COUNTERS
;           R6'     PROPULSION EDGE DELAY COUNTERS -
;           R7'        FOR SENSITIVITY CHECK
;            R32''  PROGRAM LOOP COUNTER
;
;
;
;

;          THE FOLLOWING ARE THE CONSTANTS USED
;          THROUGHOUT THE SOFTWARE...
;
;          SINCE THERE IS NO "SUBTRACT" INSTRUCTION
;          IN THE MCS-48 LANGUAGE, ALL SUCH
;          ARITHMETIC OPERATIONS ARE PERFORMED
;          BY ADDING THE COMPLIMENT OF THE
;          NUMBER THAT WOULD OTHERWISE BE
;          SUBTRACTED...
;
;          THESE FIRST SIX CONSTANTS ARE USED
;          TO TEST THE MAGNITUDE OF A NUMBER,
;          AND THESE TESTS ARE PERFORMED AS
;          JUST DESCRIBED ABOVE...

026        HI25    EQU     26H     ;FOUR COUNTS EXPECTED,
02A        LO25    EQU     2AH     ;CONSTANTS ARE THE
                                   ;COMPLIMENT OF
                                   ; [ (219 - 4) +2/-1 ]

049        MPH3LO  EQU     49H     ;THESE TWO CONSTANTS AR
   E
046        MPH3HI  EQU     46H     ;FOR COMPARISON OF 3 M
   H
                                   ;WITH 0.3 MPH HYSTERESI
   S

047        HITIME  EQU     47H     ;COMPLIMENT OF
04C        LOTIME  EQU     4CH     ; [ 182  +/- 2 COUNTS


;
;          OTHER CONSTANTS FOLLOW...
;
```

```
00DB          STPCNT   EQU     219    ;COUNT FOR 0.5 MPH
001E          WHEELH   EQU      30    ;<< 3 SECOND WHEEL
0000          WHEELO   EQU       0    ;<<   STOP DELAY
0078          EDGEHI   EQU     120    ;<< 12 SECOND
0000          EDGELO   EQU       0    ;<<  EDGE DELAY
0040          DIPDEL   EQU      64    ;25 MILLISEC. DIP DELAY
00FF          NMRDEL   EQU     255    ;100 MILLISEC. NMR DELA
  Y
0005          LEDHI    EQU       5    ;<< 1 HZ. LED FLASH
0000          LEDLO    EQU       0    ;<<  RATE COUNT
000A          PRGLPS   EQU      10    ;10 PROGRAM LOOPS
        ;
        ;     THE TIMER IS AN "UP-COUNTER". THE NUMBER
        ;     LOADED INTO THE COUNTER MUST THEREFORE BE THE
        ;     NUMBER WHICH, WHEN ADDED TO THE NUMBER OF
        ;     COUNTS DESIRED, EQUALS 256...AND OVERFLOWS.
        ;     (I.E. 256 - DESIRED COUNT = NUMBER LOADED )
        ;
00D8          TSTTIM   EQU     216    ;TIMER TEST DIVIDE RATE
00FC          TIMER    EQU     252    ;NORMAL TIME DIVIDER
                                      ;  RATE.. = 2.56 KHZ
0010          FIRE     EQU     10H    ;VALUE TO FIRE CROWBAR

        $     EJECT
0000          ORG      0

0000 0474     JMP        POWRUP;   GO TO POWER-UP ROUTINE
0002 00       NOP
0003 BA02     MOV      R2,#02H ;   IF INTERRUPT OCCURS,
0005 44A0     JMP        FAILUR;     FAILURE OCCURRED !!

        $     TITLE(' TIMED INTERRUPT ROUTINE  01/15/80 ')
        $     EJECT


0007 D5  TIMEIN. SEL      RB1
0008 A9       MOV      R1,A    ;   SAVE ACCUMULATOR
0009 C5       SEL      RB0     ;
000A 23FC     MOV      A,#TIMER;   RE-INITIALIZE
000C 62       MOV      T,A     ;     TIMER
000D FB       MOV      A, R3   ;   COMPLIMENT
000E 67       RRC        A     ;     TRANSFORMER
000F A7       CPL        C     ;       DRIVE
0010 F7       RLC        A     ;        BIT
0011 AB       MOV      R3,A    ;          AND
0012 90       MOVX     @R0,A   ;           OUTPUT


0013 D5       SEL      RB1     ;   SELECT SECOND REG. BANK
0014 ED24     DJNZ     R5,SPDCHK;   IF NOT
0016 EC24     DJNZ     R4,SPDCHK;     1 HZ,  BYPASS
0018 BC05     MOV      R4,#LEDHI;   RESET GREEN LED
001A BD00     MOV      R5,#LEDLO;     FLASH COUNTERS
001C C5       SEL      RB0

001D FB       MOV      A,R3    ;   COMPLIMENT
001E F7       RLC        A     ;     GREEN LED
001F A7       CPL        C     ;      DRIVE
0020 67       RRC        A     ;       BIT
0021 AB       MOV      R3,A    ;         AND
0022 90       MOVX     @R0,A   ;           OUTPUT
0023 D5       SEL        RB1

0024 F8  SPDCHK. MOV      A,R0    ;   < IF SPEED COUNTERS
0025 D232     JB6        NMRCHK;   < COUNT DOWN TO '0',

0027 C5       SEL        RB0   ;
0028 FF       MOV      A,R7    ;   CHECK FOR ZERO
0029 C62D     JZ         SKIPIT,     SPEED COUNT


```

```
                                          ;  < SET FLAG INDICATING
002B EF32            DJNZ    R7,NMRCHK;      < A COUNT-DOWN TO
                                      ;   < ZERO...AND
002D D5      SKIPIT: SEL       RB1   ;   < KEEP COUNT AT
002E F8              MOV     A,R0    ;   < ZERO UNTIL NEXT EOA
002F 4340            ORL     A,#40H  ;   < EDGE WHEN "SPEED"
0031 A8              MOV     R0,A    ;   < WILL CLEAR THE FLAG

0032 D5      NMRCHK: SEL       RB1   ;
0033 F8              MOV     A,R0    ;   IF NMR DELAY
0034 37              CPL       A     ;     NOT SOUGHT,
0035 7240            JB3       WHLCHK;       BYPASS...
0037 37              CPL       A     ;   IF DELAY
0038 5240            JB2       WHLCHK;     ACHIEVED, BYPASS...
003A EB40            DJNZ    R3,WHLCHK;
003C F8              MOV     A,R0    ;   WHEN DELAY
003D 4304            ORL     A, #04H ;     ACHIEVED, SET DELAY
003F A8              MOV     R0,A    ;       COMPLETE FLAG


0040 D5      WHLCHK: SEL       RB1   ;   CHECK TO SEE
0041 F8              MOV     A,R0    ;     IF DELAYING FOR
0042 C5              SEL       RB0   ;       STOPPED WHEEL
0043 37              CPL       A     ;   IF NOT,
0044 F253            JB7       EOATST;          BYPASS...
0046 37              CPL       A     ;   IF DELAY COMPLETE,
0047 3253            JB1       EOATST;          BYPASS...
0049 ED53            DJNZ    R5,EOATST;  WHEN DELAY
004B EC53            DJNZ    R4,EOATST;    IS ACHIEVED
004D D5              SEL       RB1   ;       SET THE
004E F8              MOV     A,R0    ;         WHEEL STOPPED
004F 4302            ORL     A,#02H  ;       DELAY
0051 A8              MOV     R0,A    ;     COMPLETE
0052 C5              SEL       RB0   ;   FLAG

0053 F9      EOATST: MOV     A,R1    ;   IF EOA TEST NOT
0054 37              CPL       A     ;     IN PROGRESS,
0055 7261            JB3       SNSTIV;       BYPASS...
0057 D5              SEL       RB1   ;   IF DELAY ALREADY
0058 F8              MOV     A,R0    ;     ACHIEVED,
0059 9261            JB4       SNSTIV;       BYPASS...
005B EA61            DJNZ    R2,SNSTIV;  WHEN DIP RELAY
005D F8              MOV     A,R0    ;     DELAY IS
005E 4310            ORL     A,#10H  ;       ACHIEVED,
0060 A8              MOV     R0,A    ;         SET FLAG


0061 D5      SNSTIV: SEL       RB1   ;   IF NOT
0062 F8              MOV     A, R0   ;     PERFORMING PICK-UP
0063 37              CPL       A     ;       SENSITIVITY
0064 B26F            JB5       ENDIT ;         TEST, BYPASS...
0066 EF6F            DJNZ    R7,ENDIT;   IF TIME LIMIT
0068 EE6F            DJNZ    R6,ENDIT;     REACHED BEFORE
006A C5              SEL       RB0   ;       FLAG IS CLEARED,
006B FA              MOV     A,R2    ;     SET APPROPRIATE
006C 4308            ORL     A,#08H  ;       BIT IN
006E AA              MOV     R2,A    ;         FAILURE WORD


006F 166F    ENDIT:  JTF       ENDIT ;   CLEAR TIMER FLAG
0071 D5              SEL       RB1   ;
0072 F9              MOV     A,R1    ;   RESTORE ACCUMULATOR
0073 93              RETR            ;   RETURN TO MAIN-LINE




             $       TITLE(' POWER RESET SYSTEM TEST 01/15/80 ')
             $       EJECT
```

```
0074 27         POWRUP: CLR     A          ;   CLEAR OUTPUT PORT, DO NOT
0075 3A                 OUTL    P2,A       ;     FIRE CROWBAR !!!
0076 37                 CPL     A          ;   SET-UP PORT 1 FOR
0077 39                 OUTL    P1,A       ;     FUTURE INPUT
0078 A5                 CLR     F1         ;   CLEAR TEMP. FLAG
0079 23F0               MOV     A,#0F0H    ;
007B 90                 MOVX    @R0,A      ;   CLEAR OUTPUT LATCH
007C 27                 CLR     A          ;   CLEAR ACCUM.
007D B800               MOV     R0,#00H    ;   CLEAR REGISTER 0
007F 17         ACLOOP: INC     A          ;   SIMPLE INCREMENT/
0080 E87F               DJNZ    R0,ACLOOP;      DECREMENT TEST
0082 C686               JZ      RAMTST
0084 14E8               CALL    PUFAIL;        IF FAILURE, SET FLAG
0086 27         RAMTST: CLR     A
0087 B83F               MOV     R0,#3FH
0089 A0         FILL00: MOV     @R0,A      ;   FILL SCRATCH PAD
008A E889               DJNZ    R0,FILL00;      WITH '00'(EXCEPT R0)
008C B840               MOV     R0,#40H
008E E892       LOOP00: DJNZ    R0,RAMCHK;     READ '00' FROM
0090 0497               JMP     FFSET ;          SCRATCH PAD 01
0092 F0         RAMCHK: MOV     A,@R0      ;      THROUGH SCRATCH
0093 C68E               JZ      LOOP00;            PAD 3F
0095 14E8               CALL    PUFAIL;        IF FAILURE, SET FLAG
0097 23FF       FFSET:  MOV     A,#0FFH    ;   SET-UP FOR ALL
0099 B83F               MOV     R0,#3FH    ;     ONE'S  TEST
009B A0         FILLFF: MOV     @R0,A      ;   FILL SCRATCH PAD
009C E89B               DJNZ    R0,FILLFF;      WITH 'FF' (EXCEPT R0 )
009E B840               MOV     R0,#40H ;
00A0 E8A4       LOOPFF: DJNZ    R0,CHKRAM;     READ 'FF' FROM
00A2 04AA               JMP     TIMTST;          SCRATCH PAD 01
00A4 F0         CHKRAM: MOV     A,@R0      ;         THROUGH
00A5 37                 CPL     A          ;       SCRATCH PAD  3F
00A6 C6A0               JZ      LOOPFF;
00A8 14E8               CALL    PUFAIL;        IF FAILURE, SET FLAG
00AA 23D8       TIMTST: MOV     A,#TSTTIM;     SET-UP TIMER
00AC 62                 MOV     T,A        ;     AND ACCUMULATOR
00AD 27                 CLR     A          ;       FOR TIMER
00AE 55                 STRT    T          ;         TEST
00AF 17         TSTLOP: INC     A          ;   LOOP UNTIL TIMER
00B0 16B6               JTF     TSTEND;          FLAG SET OR
00B2 C6B6               JZ      TSTEND;            ACCUMULATOR
00B4 04AF               JMP     TSTLOP;              LIMIT
00B6 A9         TSTEND: MOV     R1,A       ;   CHECK
00B7 0347               ADD     A,#HITIME;        TIMER
00B9 F6C0               JC      NOGOOD;             FUNCTION...
00BB F9                 MOV     A,R1       ;    ( ALLOW
00BC 034C               ADD     A,#LOTIME;           TOLERANCE )
00BE F6C2               JC      INISHL;
00C0 14E8       NOGOOD: CALL    PUFAIL;        IF FAILURE, SET FLAG
00C2 23FC       INISHL: MOV     A,#TIMER;      INITIALIZE
00C4 62                 MOV     T,A        ;     AND ENABLE
00C5 55                 STRT    T          ;       TIMED
00C6 25                 EN      TCNTI ;              INTERRUPTS
00C7 BFDB               MOV     R7,#STPCNT;    INITIALIZE SPEED REG
00C9 B819               MOV     R0,#19H ;      SET-UP POINTER
00CB B901               MOV     R1,#01H ;      SET POWER-UP FLAG
00CD BBF0               MOV     R3,#0F0H;      INITIALIZE OUTPUT REG.
```

```
00CF B000          MOV   @R0,#00H;    INITIALIZE FLAGS
00D1 C8            DEC    R0    ;
00D2 B000          MOV   @R0,#00H;    INITIALIZE FLAGS
00D4 D5            SEL    RB1   ;
00D5 BC05          MOV   R4,#LEDHI;   INITIALIZE FLASH
00D7 BD00          MOV   R5,#LEDLO;     COUNTERS
00D9 BE00          MOV   R6,#00  ;    CLEAR REGISTER
00DB C5            SEL    RB0   ;
00DC 85            CLR    F0    ;     SET
00DD 95            CPL    F0    ;         FLAG

00DE 76E4          JF1    SETIT ;     CHECK FAILURE FLAG
00E0 BA00          MOV   R2,#00H ;    IF NONE, CLEAR WORD
00E2 2400          JMP    SPEED ;     BEGIN EXECUTION

00E4 BA02   SETIT: MOV   R2,#02H ;    SET KERNAL FAILURE
00E6 44A0          JMP    FAILUR;     ACT ON FAILURE

00E8 A5     PUFAIL: CLR   F1    ;     SET TEMPORARY
00E9 B5            CPL    F1    ;       FAILURE FLAG
00EA 93            RETR         ;

            $      TITLE('  SPEED ACQUISITION & DETERM.  05/05/80
            $      EJECT

0100               ORG   100H

0100 B818   SPEED: MOV   R0,#18H ;    RESET POINTER
0102 360B          JT0    T0UP  ;     EOA "UP", CHECK FOR EDGE
0104 85            CLR    F0    ;     EOA DOWN, CLEAR FLAG
0105 F0            MOV   A,@R0  ;     IF NOT
0106 37            CPL    A     ;       COUNT-OUT,
0107 D246          JB6    ENDAQC;          BYPASS...
0109 2426          JMP    CNTOUT;

010B B646   T0UP:  JF0    ENDAQC;     IF NOT EOA EDGE, BYPASS..
010D F9            MOV   A,R1   ;     CLEAR
010E 53FE          ANL   A, #0FEH;      POWER-UP
0110 A9            MOV   R1,A   ;         FLAG

0111 B646          JF0    ENDAQC;     IF NOT EOA EDGE, BYPASS...
0113 35            DIS    TCNTI ;     DISABLE TIMER TO READ/
0114 FF            MOV   A,R7   ;       TRANSFER SPEED COUNT
0115 AE            MOV   R6,A   ;         INTO STORAGE REG.
0116 BFDB          MOV   R7,#STPCNT;  RELOAD COUNTER

0118 A5     PASSIT: CLR   F1    ;     SET "NEW-
0119 B5            CPL    F1    ;        SPEED" FLAG
011A 85            CLR    F0    ;     SET EOA
011B 95            CPL    F0    ;        LEVEL FLAG
011C 25            EN     TCNTI ;     ENABLE TIMER

011D F0            MOV   A,@R0  ;     CLEAR
011E 53BF          ANL   A,#0BFH ;      "COUNT-OUT"
0120 A0            MOV   @R0,A  ;          FLAG

0121 16D5          JTF    CALLIT;     IF TIMER FLAG, "TIMEIN"

0123 FE     RETURN: MOV  A,R6   ;     IF COUNT NOT ZERO,
0124 9637          JNZ    NTSTOP;         THEN NOT STOPPED
0126 F0     CNTOUT: MOV  A,@R0  ;     IF ALREADY
0127 1246          JB0    ENDAQC;       STOPPED, BYPASS...
```

```
0129 BC1E                 MOV    R4,#WHEELH;  SET-UP COUNTERS FOR
012B BD00                 MOV    R5,#WHEELO;    3 SECOND DELAY
012D F0                   MOV    A,@R0    ;   SET "WHEEL-STOP"
012E 4380                 ORL    A,#80H   ;       DELAY
0130 A0                   MOV    @R0,A    ;         FLAG
0131 F0                   MOV    A,@R0    ;   SET
0132 4301                 ORL    A,#01H   ;     "STOPPED"
0134 A0                   MOV    @R0,A    ;       FLAG
0135 2446                 JMP      ENDAQC;

0137 F9        NTSTOP:    MOV    A,R1     ;   IF TESTING EOA,
0138 7269                 JB3      TSTING;      BYPASS...
013A F0                   MOV    A,@R0    ;   CLEAR "STOPPED"
013B 53DE                 ANL    A,#0DEH  ;   & PROPULSION EDGE FLAG
013D A0                   MOV    @R0,A    ;         FLAG
                                          ;   CLEAR
013E F0                   MOV    A,@R0    ;     "WHEEL-STOP" DELAY &
013F 537D                 ANL    A,#7DH   ;     "WHEEL-STOP" DELAY
0141 A0                   MOV    @R0,A    ;         COMPLETE FLAGS
0142 F9                   MOV    A,R1     ;   CLEAR TEST
0143 53FB                 ANL    A,#0FBH  ;     PERFORMED
0145 A9                   MOV    R1,A     ;       FLAG

0146 B818      ENDAQC:    MOV    R0,#18H  ;   POINT TO OTHER FLAGS REG.
0148 F9                   MOV    A,R1     ;   IF TESTING
0149 7269                 JB3      TSTING;      EOA, BYPASS...
014B F0                   MOV    A,@R0    ;   RETRIEVE FLAGS
014C 37                   CPL      A      ;   IF NOT
014D 12A8                 JB0      NEWSPD;      STOPPED, BYPASS...

014F F9        DUNCHK:    MOV    A,R1     ;   IF TEST ALREADY
0150 52A8                 JB2      NEWSPD;      PERFORMED, BYPASS...
                                          ;   IF WHEEL
0152 F0                   MOV    A,@R0    ;     STOP DELAY
                                          ;       NOT YET
0153 37                   CPL      A      ;         ACHIEVED,
0154 32D3                 JB1      LEAVE  ;       BYPASS...
0156 D5                   SEL      RB1    ;   SET-UP DIP
0157 BA40                 MOV    R2,#DIPDEL;     DELAY
0159 C5                   SEL      RB0    ;         COUNTER
015A F0                   MOV    A,@R0    ;   CLEAR "DELAY
015B 53EF                 ANL    A,#0EFH  ;     COMPLETE"
015D A0                   MOV    @R0,A    ;       FLAG
015E F9                   MOV    A,R1     ;   SET EOA TEST &
015F 430A                 ORL    A,#0AH   ;     PICK-UP
0161 A9                   MOV    R1,A     ;       FLAGS
0162 FB                   MOV    A,R3     ;   PICK-UP
0163 430C                 ORL    A,#0CH   ;     DIP RELAYS
0165 AB                   MOV    R3,A     ;       AND UPDATE
0166 90                   MOVX   @R0,A    ;         OUTPUT VALUE
0167 246D                 JMP    PDLYCH   ;   BYPASS NEXT TEST

0169 F9        TSTING:    MOV    A,R1     ;   IF DELAYING
016A 37                   CPL      A      ;     FOR DROP-OUT
016B 3297                 JB1      DDLYCH;        BYPASS...

016D F0        PDLYCH:    MOV    A,@R0    ;   IF DELAY NOT
016E 37                   CPL      A      ;     COMPLETE, LEAVE
016F 92D3                 JB4      LEAVE  ;       THIS MODULE
0171 09                   IN     A,P1     ;   READ INPUT PORT
0172 5360                 ANL    A,#60H   ;   MASK CONTINUITY INPUTS
0174 4A                   ORL    A,R2     ;     AND PLACE INTO
0175 AA                   MOV    R2,A     ;       FAILURE REGISTER
0176 FE                   MOV    A,R6     ;   TEST LOW HALF
0177 0326                 ADD    A,#HI25  ;     ( WITH TOLERANCE )
0179 F680                 JC       AMPFLG
017B FE                   MOV    A,R6     ;   TEST LOW HALF
017C 032A                 ADD    A,#LO25  ;     ( WITH TOLERANCE )
017E F684                 JC       TSTCPL;
```

```
0180 2380   AMPFLG: MOV     A,#80H  ;   IF FAILED, SET
0182 4A             ORL     A,R2    ;     APPROPRIATE
0183 AA             MOV     R2,A    ;       FAILURE BIT
0184 2304   TSTCPL: MOV     A,#04H  ;   SET "TEST
0186 49             ORL     A,R1    ;     PERFORMED" &
0187 53FD           ANL     A,#0FDH ;
0189 A9             MOV     R1,A    ;     "DROP-OUT" FLAGS
018A D5             SEL       RB1   ;   SET-UP DIP
018B BA40           MOV     R2,#DIPDEL;    DELAY
018D C5             SEL       RB0   ;         COUNTER
018E F0             MOV     A,@R0   ;   CLEAR
018F 53EF           ANL     A,#0EFH ;     "DELAY COMPLETE"
0191 A0             MOV     @R0,A   ;        FLAG
0192 FB             MOV     A,R3    ;   DROP-OUT
0193 53F3           ANL     A,#0F3H ;     DIP RELAYS
0195 AB             MOV     R3,A    ;       AND UPDATE
0196 90             MOVX    @R0,A   ;         OUTPUT VALUE
0197 F0     DDLYCH: MOV     A,@R0   ;   IF DELAY NOT
0198 37             CPL       A     ;     COMPLETE, LEAVE
0199 92D3           JB4       LEAVE ;       THIS MODULE
019B A5             CLR       F1    ;   CLEAR NEW SPEED FLAG
019C F9             MOV     A,R1    ;   CLEAR
019D 53F7           ANL     A,#0F7H ;     EOA TEST
019F A9             MOV     R1,A    ;       FLAG
01A0 F0             MOV     A,@R0   ;   SET "COUNT-OUT" &
01A1 4341           ORL     A,#41H  ;     "STOPPED" FLAGS
01A3 A0             MOV     @R0,A   ;       AFTER TEST
01A4 BF00           MOV     R7,#00  ;   CLEAR "SPEED" COUNTER
                                    ;     FOR FIRST EDGE
01A6 85             CLR       F0    ;   SET EOA
01A7 95             CPL       F0    ;     LEVEL FLAG
01A8 76B4   NEWSPD: JF1       AVAIL ;   IF SPEED VALUE
                                    ;    AVAILABLE, JUMP
01AA F9             MOV     A,R1    ;   IF POWER-UP,
01AB 37             CPL       A     ;     SET LOW
01AC 12B2           JB0       ENDSPD;       SPEED FLAG
01AE F9             MOV     A,R1    ;     THEN LEAVE MODULE..
01AF 4380           ORL     A,#80H  ;   OTHERWISE,
01B1 A9             MOV     R1,A    ;     JUST LEAVE MODULE
01B2 4400   ENDSPD. JMP       DOPB  ;
01B4 A5     AVAIL:  CLR       F1    ;   CLEAR "NEW SPEED" FLAG
01B5 FE             MOV     A,R6    ;   CHECK SPEED COUNT
01B6 0349           ADD     A,#MPH3LO;   IF < 3 MPH,
01B8 E6C5           JNC       BELOW ;       JUMP
01BA FE     ABOVE:  MOV     A,R6    ;   CHECK > 3 MPH
01BB 0346           ADD     A,#MPH3HI;    WITH HYSTERESIS
01BD E6D3           JNC       LEAVE ;   IF NOT, LEAVE MODULE
01BF F9             MOV     A,R1    ;   CLEAR "LOW SPEED",
01C0 536B           ANL     A,#6BH  ;    "CONSECUTIVE SPEEDS", &
01C2 A9             MOV     R1,A    ;    "TEST PERFORMED" FLAGS
01C3 4400           JMP       DOPB  ;   GO TO NEXT MODULE
01C5 FE     BELOW:  MOV     A,R6    ;   SPEED MUST STILL BE
01C6 C6D3           JZ        LEAVE ;     NON-ZERO TO SET FLAG
01C8 F9             MOV     A,R1    ;   IF THIS IS SECOND
01C9 92D0           JB4       SETFLG;    CONSECUTIVE < 3 MPH, JUMP
01CB 4310           ORL     A,#10H  ;   IF NOT, SET FLAG
01CD A9             MOV     R1,A    ;     FOR NEXT ATTEMPT
01CE 4400           JMP       DOPB  ;   GO TO NEXT MODULE
01D0 4380   SETFLG: ORL     A, #80H ;   SET "LOW
01D2 A9             MOV     R1,A    ;     SPEED" FLAG
```

```
01D3 4400      LEAVE:   JMP       DOPB    ;   LEAVE MODULE

01D5 1407      CALLIT:  CALL      TIMEIN;     TIMED INTERRUPT
01D7 2423               JMP       RETURN;     JUMP BACK INTO FLOW

               $        TITLE('  DOOR OPEN PUSH-BUTTON  01/15/80 ')
               $        EJECT

0200                    ORG     200H

0200 09        DOPB:    IN      A,P1      ;   READ INPUT PORT
0201 37                 CPL       A       ;   CHECK SWITCH
0202 320C               JB1       DEACT   ;     STATUS
0204 F9                 MOV     A,R1      ;   IF ACTUATED,
0205 F212               JB7       PROPUL;      AND ABOVE LOW SPEED
0207 53DF               ANL     A,#0DFH   ;     CLEAR "NOT-DOPB"
0209 A9                 MOV     R1,A      ;       FLAG BIT

020A 4412               JMP       PROPUL;     GO TO NEXT MODULE

020C F9        DEACT:   MOV     A,R1      ;   IF DE-ACTUATED,
020D 4320               ORL     A,#20H    ;     SET "NOT-DOPB"
020F A9                 MOV     R1,A      ;       FLAG BIT
0210 4412               JMP       PROPUL;     GO TO NEXT MODULE

               $        TITLE('  PROPULSION INPUT ROUTINE  05/08/80')
               $        EJECT

0212 09        PROPUL:  IN      A,P1      ;   READ INPUT PORT
0213 530C               ANL     A,#0CH    ;   MASK PROPULSION BITS
0215 962B               JNZ       NOTPWR;     IF BOTH NOT POWER, BYPASS.

0217 F9                 MOV     A,R1      ;   BOTH BITS SHOW PROPULSION.
0218 37                 CPL       A       ;   IF PROPULSION
0219 D225               JB6       POWER   ;     PREVIOUSLY, BYPASS.
021B D5                 SEL       RB1     ;   INITIALIZE PROPULSION
021C BE78               MOV     R6,#EDGEHI;         EDGE DELAY
021E BF00               MOV     R7,#EDGELO;           COUNTER
0220 C5                 SEL       RB0     ;           REGISTERS
0221 F0                 MOV     A,@R0     ;   SET
0222 4320               ORL     A,#20H    ;     PROPULSION
0224 A0                 MOV     @R0,A     ;       EDGE FLAG

0225 F9        POWER:   MOV     A,R1      ;   CLEAR
0226 53BF               ANL     A,#0BFH   ;     "NOT-PROPULSION"
0228 A9                 MOV     R1,A      ;         FLAG
0229 4438               JMP       CLRTMP;     GO TO NEXT MODULE

022B 37        NOTPWR:  CPL       A       ;   CHECK THAT BOTH BITS
022C 530C               ANL     A,#0CH    ;     SHOW NOT PROPULSION...
022E 963D               JNZ       NOTOK   ;   IF NOT, GO HANDLE FAILURE

0230 F9                 MOV     A,R1      ;   SET
0231 4340               ORL     A,#40H    ;     "NOT-PROPULSION"
0233 A9                 MOV     R1,A      ;         FLAG
0234 F0                 MOV     A,@R0     ;   CLEAR
0235 53DF               ANL     A,#0DFH   ;     PROPULSION
0237 A0                 MOV     @R0,A     ;       EDGE FLAG
0238 FA        CLRTMP:    MOV     A,R2     ;CLEAR TEMPORARY
0239 53FE               ANL     A,#0FEH   ;  FAILURE FLAG
023B 4458               JMP      DECIDE   ;GO TO NEXT MODULE
023D B820      NOTOK:   MOV     R0,#20H   ;POINT TO TEMP. FAIL  REG.
```

```
023F FA                  MOV     A,R2     ;IF TEMP. FAIL. FLAG
0240 124B                JB0      PRGCNT ;  SET BYPASS...
0242 4301                ORL     A,#01H  ;OTHRWISE SET TEMP.
0244 AA                  MOV     R2,A     .  FAILURE FLAG AND
0245 B00A                MOV     @R0,#PRGLPS, INITIALIZE COUNTER
0247 B818      POINT:     MOV     R0,#18H ;RESET POINTER
0249 4458                JMP      DECIDE ,GO TO NEXT MODULE
024B F0        PRGCNT:   MOV     A,@R0    ;DECREMENT TEMP.
024C 07                  DEC     A        ;  FAILURE COUNTER
024D A0                  MOV     @R0,A    ,    IF NOT ZERO
024E 9647                JNZ     POINT    ;         BYPASS...
0250 FA                  MOV     A,R2     ;SET APPROPRIATE
0251 4310                ORL     A,#10H   ;  FAILURE
0253 AA                  MOV     R2,A     ;     BIT
0254 B818                MOV     R0,#18H ;RESET POINTER
0256 44A0                JMP     FAILUR ;HANDLE FAILURE
               $         TITLE(' OUTPUT DECISION MODULE  05/07/80 ')
               $         EJECT
0258 FA        DECIDE:  MOV     A,R2     ;    GET FAILURE STATUS
0259 53FE               ANL     A,#0FEH ;MASK TEMP. FAIL FLAG
025B 96A0               JNZ       FAILUR;    JUMP IF ANY FAILURE
025D F9                 MOV     A,R1     ;    MASK OFF: "LOW SPEED",
025E 37                 CPL       A      ;      "NOT-PROPULSION", AND
025F 53E0               ANL     A,#0E0H ;        "NOT-DOPB" FLAGS
0261 966F               JNZ       DRPOUT;    IF NOT ALL TRUE, JUMP
0263 FB        PICKUP;  MOV     A,R3     ;    IF FIRST TIME,
0264 3268               JB1       FRSTBY;      SET UP DELAY
0266 5495               CALL      FRSTIM;
0268 FB        FRSTBY:  MOV     A,R3     ;    GET OUTPUT VALUE,
0269 4302               ORL     A,#02H   ;    PICK-
026B AB                 MOV     R3,A     ;          UP
026C 90                 MOVX    @R0,A    ;              NMR
026D 447A               JMP       FEEDBK;
026F FB        DRPOUT   MOV     A,R3     ;    IF FIRST TIME,
0270 37                 CPL     A        ;      SET UP
0271 3275               JB1       BYFRST;        NMR DELAY
0273 5495               CALL      FRSTIM;
0275 FB        BYFRST:  MOV     A,R3     ;    GET OUTPUT VALUE,
0276 53FD               ANL     A,#0FDH ;    DROP-
0278 AB                 MOV     R3,A     ;          OUT
0279 90                 MOVX    @R0,A    ;              NMR
027A F0        FEEDBK:  MOV     A,@R0    ;    CHECK IF NMR
027B 527F               JB2       NMRINP;      DELAY COMPLETED
027D 2400               JMP       SPEED ;    IF NOT, RUN PROGRAM AGAIN
027F 09        NMRINP:  IN      A,P1     ;    READ INPUT PORT
0280 1288               JB0       INPDO ;    JUMP IF DROP-OUT READ
0282 FB                 MOV     A,R3     ;    NMR PICKED-UP ACCORDING
0283 37                 CPL     A        ;      TO INPUT PORT, VERIFY
0284 328D               JB1      FAILED;        WITH  STATUS FLAG
0286 2400               JMP      SPEED ;    RUN THROUGH PROGRAM AGAIN
0288 FB        INPDO.   MOV     A,R3     ,    INPUT SAYS DROPPED-OUT...
0289 328D               JB1      FAILED,    IF STATUS IS PICK-UP, FAIL!
```

```
028B 2400      NTFAIL.  JMP      SPEED ;      RUN THROUGH PROGRAM AGAIN

028D FA        FAILED.  MOV      A,R2   ;     SET APPROPRIATE BIT
028F 128B               JB0      NTFAIL ;
0290 4304               ORL      A,#04H ;       IN FAILURE STATUS
0292 AA                 MOV      R2,A   ;         WORD & ACT
0293 44A0               JMP      FAILUR;            ON IT

0295 D5        FRSTIM.  SEL      RB1    ;     SUB-ROUTINE TO
0296 BBFF               MOV      R3,#NMRDEL;      SET UP NMR
0298 F8                 MOV      A,R0   ;       DELAY COUOLTER
0299 4308               ORL      A,#08H ;       AND SET NMR DELAY IN
029B 53FB               ANL      A,#0FBH ;      PROGRESS AND CLEAR
029D A8                 MOV      R0,A   ;       NMR DELAY COMPLETE
029E C5                 SEL      RB0    ;       FLAGS
029F 83                 RET             ;

               $        TITLE('  FAILURE HANDLING ROUTINE   05/06/80 ')
               $        EJECT

02A0 FB        FAILUR:  MOV      A,R3   ;     GET OUTPUT VALUE
02A1 53FD               ANL      A,#0FDH ;        AND
02A3 AB                 MOV      R3,A   ;           DROP-OUT
02A4 90                 MOVX     @R0,A  ;         NMR

02A5 D5                 SEL      RB1    ;     SET-UP NMR
02A6 BBFF               MOV      R3,#NMRDEL;    DELAY COUNTER
02A8 C5                 SEL      RB0    ;             REGISTERS

02A9 F0                 MOV      A,@R0  ;     SET NMR DELAY FLAG AND
02AA 4308               ORL      A,#08H ;       CLEAR NMR DELAY
02AC 53FB               ANL      A,#0FBH ;        COMPLETE
02AE A0                 MOV      @R0,A  ;           FLAG

02AF FA                 MOV      A,R2   ;CLEAR TEMPORARY
02B0 53FE               ANL      A,#0FEH ;    FAILURE
02B2 AA                 MOV      R2,A   ;       FLAG
02B3 97        CONVRT.  CLR      C      ;     < ENCODE 8-BIT
02B4 27                 CLR      A      ;     < FAILURE REGISTER
02B5 2A        CONTIN:  XCH      A,R2   ;     < TO A 3-BIT
02B6 67                 RRC      A      ;     < BINARY NUMBER
02B7 F6BE               JC       ENDCON;      < TO ALLOW
02B9 2A                 XCH      A,R2   ;     <  DISPLAY
02BA 0310               ADD      A,#10H ;     <  OF FAILURE
02BC 44B5               JMP      CONTIN;      <  CODE

02BE 2A        ENDCON:  XCH      A,R2   ;     INCLUDE
02BF 5370               ANL      A,#70H ;       FAILURE CODE
02C1 37                 CPL      A      ;         IN
02C2 53F0               ANL      A,#0F0H ;          NEW
02C4 AB                 MOV      R3,A   ;         OUTPUT VALUE

02C5 FB        LOOP:    MOV      A,R3   ;     OUTPUT
02C6 90                 MOVX     @R0,A  ;       FAILURE CODE
02C7 F0                 MOV      A,@R0  ;     WAIT UNTIL
02C8 37                 CPL      A      ;       NMR DELAY
02C9 52C5               JB2      LOOP   ;         COMPLETE
02CB 35                 DIS      TCNTI  ;     DISABLE TIMED INTERRUPTS

02CC 09        NMRLOP:  IN       A,P1   ;     READ INPUT PORT
02CD 12CC               JB0      NMRLOP;      KEEP MONITORRING NMR

02CF 2310               MOV      A,#FIRE ;    VALUE TO FIRE CROWBAR
02D1 3A        CRWBAR.  OUTL     P2,A   ;     CONTINUE TO
```

```
0202 44D1          907        JMP        CRWBAR;       FIRE CROWBAR
                   908
                   909
                   910        END

USER SYMBOLS
ABOVE  01BA    ACLOOP 007F    AMPFLG 0180    AVAIL  01B4    BELOW  01C5
BYFRST 0275    CALLIT 01D5    CHKRAM 00A4    CLRTMP 0238    CNTOUT 0126
CONTIN 02B5    CONVRT 02B3    CRWBAR 02D1    DDLYCH 0197    DEACT  020C
DECIDE 0258    DIPDEL 0040    DOPB   0200    DRPOUT 026F    DUNCHK 014F
EDGEHI 0078    EDGELO 0000    ENDAQC 0146    ENDCON 02BE    ENDIT  006F
ENDSPD 01B2    EOATST 0053    FAILED 028D    FAILUR 02A0    FEEDBK 027A
FFSET  0097    FILL00 0089    FILLFF 009B    FIRE   0010    FRSTBY 0268
FRSTIM 0295    HI25   0026    HITIME 0047    INISHL 00C2    INPDO  0288
LEAVE  01D3    LEDHI  0005    LEDLO  0000    LO25   002A    LOOP   02C5
LOOP00 008E    LOOPFF 00A0    LOTIME 004C    MPH3HI 0046    MPH3LO 0049
NEWSPD 01A8    NMRCHK 0032    NMRDEL 00FF    NMRINP 027F    NMRLOP 02CC
NOGOOD 00C0    NOTOK  023D    NOTPWR 022B    NTFAIL 028B    NTSTOP 0137
PASSIT 0118    PDLYCH 016D    PICKUP 0263    POINT  0247    POWER  0225
POWRUP 0074    PRGCNT 024B    PRGLPS 000A    PROPUL 0212    PUFAIL 00E8
RAMCHK 0092    RAMTST 0085    RETURN 0123    SETFLG 01D0    SETIT  00E4
SKIPIT 002D    SNSTIV 0061    SPDCHK 0024    SPEED  0100    STPCNT 00DB
TOUP   010B    TIMEIN 0007    TIMER  00FC    TIMTST 00AA    TSTCPL 0184
TSTEND 00B6    TSTING 0169    TSTLOP 00AF    TSTTIM 00D8    WHEELH 001E
WHEELO 0000    WHLCHK 0040

ASSEMBLY COMPLETE,   NO ERRORS

ABOVE   676#
ACLOOP  426#   427
AMPFLG  622    627#
AVAIL   661    671#
BELOW   674    687#
BYFRST  817    819#
CALLIT  547    700#
CHKRAM  450    452#
CLRTMP  752    764#
CNTOUT  523    553#
CONTIN  882#   887
CONVRT  880#
CRWBAR  906#   907
DDLYCH  611    646#
DEACT   712    721#
DECIDE  766    774    793#
DIPDEL  278#   595    636
DOPB    669    685    693    698    710#
DRPOUT  800    815#
DUNCHK  587#
EDGEHI  276#   742
EDGELO  277#   743
ENDAQC  522    525    530    554    563    580#
ENDCON  884    889#
ENDIT   393    394    395    402#   402
ENDSPD  665    669#
EOATST  367    369    370    371    378#
FAILED  833    837    840#
FAILUR  301    501    783    795    844    863#
FEEDBK  810    824#
FFSET   438    443#
FILL00  433#   434
FILLFF  446#   447
FIRE    293#   905
FRSTBY  804    806#
FRSTIM  805    818    846#
HI25    258#   621
HITIME  267#   468
INISHL  472    476#
INPDO   829    836#
LEAVE   593    615    648    678    688    698#
LEDHI   280#   323    488
LEDLO   281#   324    489
```

```
LO25     259#    624
LOOP     895#    899
LOOP00   437#    440
LOOPFF   450#    454
LOTIME   268#    471
MPH3HI   264#    677
MPH3LO   263#    673
NEWSPD   585     588     661#
NMRCHK   336     344     351#
NMRDEL   279#    847     869
NMRINP   825     828#
NMRLOP   902#    903
NOGOOD   469     474#
NOTOK    756     767#
NOTPWR   736     754#
NTFAIL   838#    841
NTSTOP   552     566#
PASSIT   536#
PDLYCH   607     613#
PICKUP   803#
POINT    773#    778
POWER    740     749#
POWRUP   298     414#
PRGCNT   769     775#
PRGLPS   282#    772
PROPUL   714     719     724     734#
PUFAIL   429     441     455     474     504#
RAMCHK   437     439#
RAMTST   428     431#
RETURN   551#    701
SETFLG   690     695#
SETIT    496     500#
SKIPIT   340     346#
SNSTIV   380     383     384     390#
SPDCHK   321     322     335#
SPEED    498     517#    826     834     838
STPCNT   273#    480     534
T0UP     518     525#
TIMEIN   307#    700
TIMER    291#    310     476
TIMTST   451     457#
TSTCPL   625     631#
TSTEND   463     464     467#
TSTING   567     582     609#
TSTLOP   462#    465
TSTTIM   290#    457
WHEELH   274#    555
WHEELO   275#    556
WHLCHK   354     356     357     363#

CROSS REFERENCE COMPLETE
```

What is claimed is:

1. A door controller for transit vehicles having a power door operator for moving at least one door in said vehicle between open and closed positions, comprising;

means sensing wheel rotation and generating motion signals;

means sensing vehicular propulsion, and generating propulsion signals;

means generating a manual door opening signal;

means generating door operating signals corresponding to door open and closed states respectively;

means responsive to first and second combinations of said motion, propulsions, and operating signals, generating an enabling signal for opening said power door when predetermined first combinations of said motion signals and propulsion signals occur;

means in said responsive means, further responsive to said manual door opening signal, for actuating said operator;

whereby said manual door opening signal moves said doors from closed to open positions on occurrence of said first combination.

2. Controller of claim 1 wherein said predetermined first combination of motion and propulsion signals comprise;

a motion signal indicating a vehicular speed less than a pre-determined value;

a propulsion signal indicating absence of vehicular propulsion.

3. The controller of claim 1 wherein said responsive means further comprises;

micro-computer means for analyzing said motion, propulsion, and manual actuation signals, and generating signals indicative of said analysis.

4. The controller of claim 1 wherein said responsive means further comprises;

means responsive to said second predetermined combinations of said motion, propulsion, and manual door operating signals for generating failure signals;

means responsive to said failure signals for rendering said controller inoperative.

5. The controller of claim 4 wherein said failure signal responsive means includes applying excessive current to a current sensitive device.

6. The controller of claim 4 wherein said failure signal responsive means further includes a failure display.

7. In combination, a power door actuator for transit vehicles having a propulsion system providing tractive effort, and at least one door in said vehicle operable by said actuator from closed to open positions, comprising;

an axle mounted pickup for generating signals indicative of vehicular speed;

means coacting with said propulsion system for generating a signal indicative of tractive effort;

means controlling said actuator, enabled by manual actuation and responsive to vehicular speed signals in first and second predetermined ranges, and further responsive to a traction signal, for initiating door operation;

whereby on manual demand, said vehicular doors are powered open under predetermined conditions of vehicular operation.

8. The combination claimed in claim 7 wherein said axle pickup is an electrical generator and said speed signals are electrical pulses.

9. The combination of claim 7 wherein said controlling means further comprises;

means responsive to two consecutive speeds in said first range.

10. The combination claimed in claim 7 wherein said predetermined first vehicular speed range is 0.5 to 2.9 miles per hour, and tractive effort signal is the absence of tractive effort, respectively.

11. The combination claimed in claim 7 wherein said controlling means further comprises;

means responding to said speed signals in said second range;

means electrically determining predetermined electrical characteristics of said pickup;

means comparing said electrical characteristics with a predetermined range of characteristics, and generating a signal when said characteristic is outside said predetermined range; and means responsive to said out of range signal and rendering said controller inoperative;

whereby said manual actuation and each vehicular speed excursion into said second range initiates said electrical determination and operational evaluation of said pickup.

12. The combination of claim 11 wherein said second speed range comprises vehicular speeds less than one half mile per hour, and means determining presence of said speed signals in said second range for more than a predetermined time period.

13. The combination claimed in claim 12 wherein said speed signals comprise discreet electrical pulses.

14. The combination of claim 13 further comprisng means determining the presence of said discreet electrical pulses for a period exceeding a predetermined time.

15. A method for opening power operated doors on mass transit vehicles having a propulsion system comprising the steps of;

sensing rotation of at least one wheel on said vehicle;

determining the speed of said vehicle from said sensed rotation;

repeating said sped determination to establish a plurality of measured speeds;

establishing a valid speed range for said speeds;

providing a valid first signal indicative of groups of said speeds within said valid speed range;

sensing the absence of propulsion in said vehicle; and generating a second signal;

generating a manual door actuating signal by train attendant operation of a manual switch, said actuating signal having signal presence and signal absence states;

sensing the signal absence state of said manual door actuating signal; and generating a third signal;

combining said signals selectively according to predetermined characteristics of said combination, thereby generating a manual door actuating signal;

enabling operation of said vehicular doors on occurrence of said manual door actuating signal; and, whereupon said vehicular doors are powered open establishing improved passenger traffic.

16. The method of claim 15, wherein said speed signal validation further comprises the step of;

identifying at least two consecutive speeds within said valid range.

17. The method of claim 6 wherein said speed signal validation further comprises the steps of;

determining that the two consecutive speeds determined to be within said valid speed range are in sequentially decreasing magnitude, whereby deceleration of said vehicle is determined.

18. The method of claim 15 wherein said propulsion sensing further includes the step of detecting the presence of discreet speed pulses from said speed determination.

19. The method of claim 15, further including the steps of comparing said selective combination and enablement, and rendering said controller inoperative by applying excessive current to an electrical over current device.

20. A manually actuated door controller for transit vehicles having a propulsion system and a power door actuator for moving at least one door from open to closed position comprising;

a wheel speed sensor for generating signals indicative of vehicular speeds;

means responsive to said speed signals within a predetermined range for establishing a first operating condition;

means manually generating a door opening signal and establishing a second operation condition;

means sequentially evaluating said first and second operating condition and generating an enabling signal when said conditions occur in a predetermined sequence;

means in said actuator responsive to said enabling signal for opening said door.

21. The controller of claim 20 wherein said predetermined sequence comprises following occurrence of said first and second conditions; wherein door operation is inhibited in the presence of a continuous manual signal during said sequential sampling.

22. The controller of claim 21 wherein;

said speed signal comprises electrical pulses, and the sequential evaluation of the third operational signal comprises;

sampling said speed signal for said pulses during predetermined interval; and indicating controller failure in the absence of said pulses.

23. The controller of claim 20 wherein said responsive means comprises identifying at least two successive speed signals having successively decreasing magnitudes, signifying deceleration of the vehicle.

24. The controller of claim 20 further comprising;

means generating signals indicative of propulsion; and said sequential evaluation includes said propulsion signal for generating a third operational condition for evaluation in said operational sequence.

* * * * *

UNITED STATES PATENT AND TRADEMARK OFFICE
CERTIFICATE OF CORRECTION

PATENT NO. : 4,491,917
DATED : January 1, 1985
INVENTOR(S) : Philip M. Higgins et al It is certified that error appears in the above—identified patent and that said Letters Patent is hereby corrected as shown below:

Col. 1, line 45, change "vehicl" to --vehicle--;
line 47, change "operation" to --operating--;
Col. 7, line 30, change "consistant" to --consistent--;
Col. 9, line 15, change "in" to --by--;
Col.10, line 19, erase "are";
line 27, change "appendix" to --Appendix--;
Col.41, line 66, change "comprisng" to --comprising--;
Col.42, line 7, change "sped" to --speed--;
line 33, change "6" to --16--;
line 34, change "steps" to --step--;

Signed and Sealed this

*Twenty-sixth* Day of *November 1985*

[SEAL]

*Attest:*

DONALD J. QUIGG

*Attesting Officer* *Commissioner of Patents and Trademarks*